(12) United States Patent
Ishiga et al.

(10) Patent No.: US 8,233,710 B2
(45) Date of Patent: Jul. 31, 2012

(54) IMAGE PROCESSING DEVICE AND IMAGE PROCESSING METHOD

(75) Inventors: Kenichi Ishiga, Yokohama (JP); Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 951 days.

(21) Appl. No.: 11/988,443

(22) PCT Filed: Jul. 14, 2006

(86) PCT No.: PCT/JP2006/314073
§ 371 (c)(1),
(2), (4) Date: Oct. 23, 2008

(87) PCT Pub. No.: WO2007/007878
PCT Pub. Date: Jan. 18, 2007

(65) Prior Publication Data
US 2009/0074324 A1      Mar. 19, 2009

(30) Foreign Application Priority Data

| Jul. 14, 2005 | (JP) | 2005-205354 |
| Jul. 14, 2005 | (JP) | 2005-205355 |
| Jul. 14, 2005 | (JP) | 2005-205356 |

(51) Int. Cl.
*G06K 9/36* (2006.01)

(52) U.S. Cl. .................. 382/167; 382/275
(58) Field of Classification Search .......... 382/162, 382/167, 255, 266, 275
See application file for complete search history.

(56) References Cited

U.S. PATENT DOCUMENTS

| 5,541,653 A | 7/1996 | Peters et al. ............ 348/264 |
| 5,999,279 A * | 12/1999 | Kouzaki et al. .......... 358/520 |
| 7,236,628 B2 | 6/2007 | Chen et al. .............. 382/167 |
| 2002/0126313 A1 * | 9/2002 | Namizuka .................. 358/2.1 |
| 2004/0150732 A1 | 8/2004 | Yamanaka .................. 348/272 |
| 2007/0035641 A1 | 2/2007 | Yamada et al. ............ 348/241 |
| 2007/0242897 A1 * | 10/2007 | Bushell et al. ............ 382/274 |

FOREIGN PATENT DOCUMENTS

| JP | A 62-145991 | 6/1987 |
| JP | A 5-3568 | 1/1993 |
| JP | A 6-113309 | 4/1994 |
| JP | A 10-319518 | 12/1998 |
| JP | A 2001-103358 | 4/2001 |
| JP | A 2001-186533 | 7/2001 |
| JP | A 2002-344978 | 11/2002 |
| JP | A 2003-50990 | 2/2003 |
| JP | A 2003-60983 | 2/2003 |
| JP | A 2004-241991 | 8/2004 |
| JP | A 2005-45433 | 2/2005 |
| JP | A 2005-175718 | 6/2005 |
| JP | A 2006-14261 | 1/2006 |
| WO | WO 02/071761 A1 | 9/2002 |

OTHER PUBLICATIONS

Notification of Reasons for Refusal for priority Japanese Patent Application No. 2005-205354, mailed on Mar. 1, 2011 (w/ English translation).
Notification of Reasons for Refusal for priority Japanese Patent Application No. 2005-205356, mailed on Mar. 1, 2011 (w/ English translation).

* cited by examiner

*Primary Examiner* — Andrew W Johns
(74) *Attorney, Agent, or Firm* — Oliff & Berridge, PLC

(57) ABSTRACT

An image processing device that converts a first image captured via an optical system in which at least one of a plurality of color components is missing in one pixel and MTF characteristics are different between a reference color component and at least one missing color component at an imaging plane, into a second image in which MTF characteristics are matched, includes: an image creation unit that acquires information concerning differences in MTF characteristics between the missing color component and the reference color component in a pixel having the missing color component of the first image and creates the second image by using the acquired information.

13 Claims, 19 Drawing Sheets

FIG.2
EXPLANATION ON MECHANISM OF OCCURRENCE OF COLOR BLEEDING
DUE TO AXIAL CHROMATIC ABERRATION
(a) 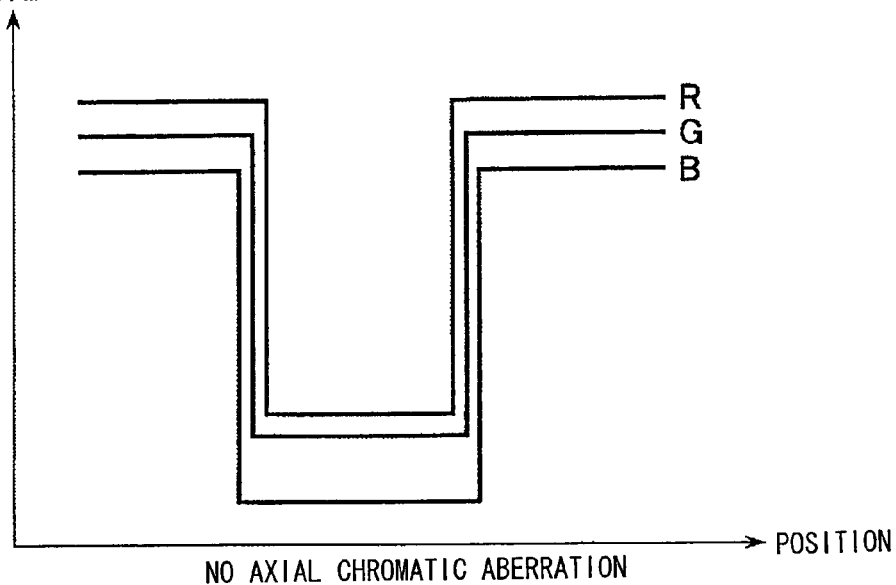
NO AXIAL CHROMATIC ABERRATION
(b) 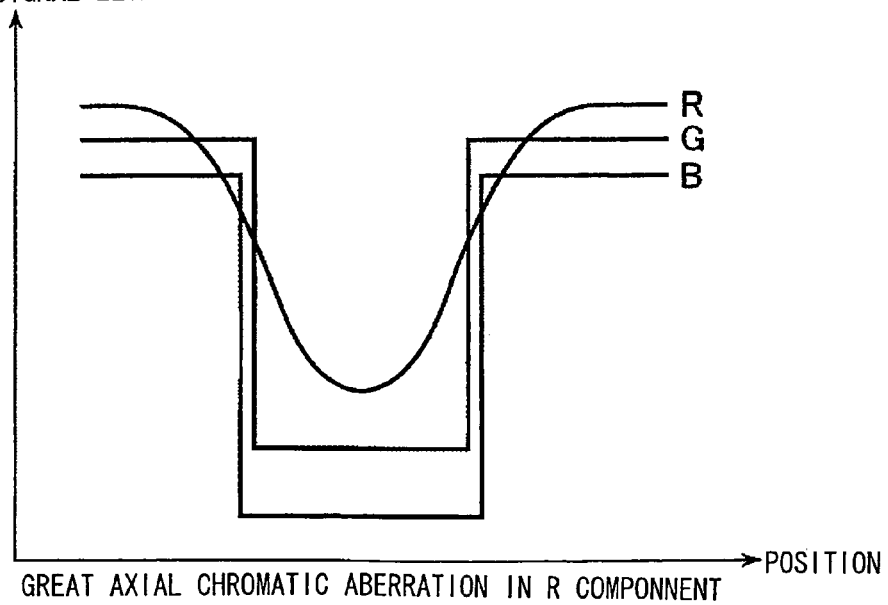
GREAT AXIAL CHROMATIC ABERRATION IN R COMPONNENT

FIG.5

| COORDINATES [i , j] | i-3 | i-2 | i-1 | i | i+1 | i+2 | i+3 |
|---|---|---|---|---|---|---|---|
| j-3 | B | G | B | G | B | G | B |
| j-2 | G | R | G | R | G | R | G |
| j-1 | B | G | B | G | B | G | B |
| j | G | R | G | R | G | R | G |
| j+1 | B | G | B | G | B | G | B |
| j+2 | G | R | G | R | G | R | G |
| j+3 | B | G | B | G | B | G | B |

BAYER ARRAY

FIG.6

| | | | | |
|---|---|---|---|---|
| | 1 | | 1 | |
| | | 4 | | |
| LPF(')= | 1 | | 1 | /8 |
| | | | | |

(a)

| | | 1 | | |
|---|---|---|---|---|
| | 2 | | 2 | |
| 1 | | 4 | | 1 |
| LPF(')= 2 | | 2 | | /16 |
| | | 1 | | |

| R | G | R | G | R |
|---|---|---|---|---|
| G | B | G | B | G |
| R | G | R | G | R |
| G | B | G | B | G |
| R | G | R | G | R |

(a) Bayer0
(WITHOUT BLURRING)

| R | G' | R | G' | R |
|---|---|---|---|---|
| G' | B | G' | B | G' |
| R | G' | R | G' | R |
| G' | B | G' | B | G' |
| R | G' | R | G' | R |

(b) Bayer1
(WITH WEAK BLURRING)

| R | G'' | R | G'' | R |
|---|---|---|---|---|
| G'' | B | G'' | B | G'' |
| R | G'' | R | G'' | R |
| G'' | B | G'' | B | G'' |
| R | G'' | R | G'' | R |

(c) Bayer2
(WITH STRONG BLURRING)

FIG.9

| R´ | G | R´ | G. | R´ |
|---|---|---|---|---|
| G | B´ | G | B´ | G |
| R´ | G | R´ | G | R´ |
| G | B´ | G | B´ | G |
| R´ | G | R´ | G | R´ |

FIG.11

$$\text{LPF('}) = \begin{array}{|c|c|c|c|c|} \hline & & 1 & & \\ \hline & 2 & 3 & 2 & \\ \hline 1 & 3 & 8 & 3 & 1 \\ \hline & 2 & 3 & 2 & \\ \hline & & 1 & & \\ \hline \end{array} \Big/ 32$$

FIG.12

| R | R | R | R | R |
|---|---|---|---|---|
| R | R | R | R | R |
| R | R | R | R | R |
| R | R | R | R | R |
| R | R | R | R | R |

(a) R PLANE
(WITHOUT BLURRING)

| G | G | G | G | G |
|---|---|---|---|---|
| G | G | G | G | G |
| G | G | G | G | G |
| G | G | G | G | G |
| G | G | G | G | G |

(b) G PLANE
(WITHOUT BLURRING)

| B | B | B | B | B |
|---|---|---|---|---|
| B | B | B | B | B |
| B | B | B | B | B |
| B | B | B | B | B |
| B | B | B | B | B |

(c) B PLANE
(WITHOUT BLURRING)

| R' | R' | R' | R' | R' |
|----|----|----|----|----|
| R' | R' | R' | R' | R' |
| R' | R' | R' | R' | R' |
| R' | R' | R' | R' | R' |
| R' | R' | R' | R' | R' |

(e) R PLANE
(WITH BLURRING)

| G' | G' | G' | G' | G' |
|----|----|----|----|----|
| G' | G' | G' | G' | G' |
| G' | G' | G' | G' | G' |
| G' | G' | G' | G' | G' |
| G' | G' | G' | G' | G' |

(f) G PLANE
(WITH BLURRING)

| B' | B' | B' | B' | B' |
|----|----|----|----|----|
| B' | B' | B' | B' | B' |
| B' | B' | B' | B' | B' |
| B' | B' | B' | B' | B' |
| B' | B' | B' | B' | B' |

(g) B PLANE
(WITH BLURRING)

FIG.15

| POSITION OF OBJECT TO BE PHOTOGRAPHED | POINT OF FOCUS OF LENS | LPF FOR G COMPONENT FOR CREATING Cr | LPF FOR R COMPONENT FOR CREATING Cr | LPF FOR G COMPONENT FOR CREATING Cb | LPF FOR R COMPONENT FOR CREATING Cb |
|---|---|---|---|---|---|
| CLOSEST | CLOSEST | LFP_a1 | OFF | LFP_b1 | OFF |
| 1m | 1m | LFP_a2 | OFF | LFP_b2 | OFF |
| 5m | 5m | LFP_a3 | OFF | LFP_b3 | OFF |
| INFINITY | INFINITY | LFP_a4 | OFF | LFP_b4 | OFF |

OPTIMAL BLUR AMOUNT $= \arg\min(\text{SATURATION RESPONS (BLUR AMOUNT)})$

IMAGE PROCESSING DEVICE AND IMAGE PROCESSING METHOD

TECHNICAL FIELD

The present invention relates to an image processing device and an image processing method that correct images captured via an optical system.

BACKGROUND ART

The following chromatic aberration correction device is known from Patent Document 1. With the chromatic aberration correction device, a color image having full three colors is corrected for deviations of foci among R, G and B caused by inclination of arrangement of R, G and B plane image sensors by applying a smoothing or sharpening filter to color planes other than a reference color plane to search a parameter of a variable filter that maximizes correlation between the color planes.

Patent Document 1: Japanese Laid-open Patent Publication No. 2001-103358

DISCLOSURE OF THE INVENTION

Problem to be Solved by the Invention

However, when it is attempted to apply the above-mentioned technology to axial chromatic aberration correction technology for a single-plate image sensor, such as a Bayer array, it is necessary to temporarily make a color image having all the three colors by using a predetermined interpolation algorithm and then check correlation relative to defocusing for each color between R, G and B planes. For this reason, the correction tends to be affected by various types of interpolation algorithms, so that there is the possibility that axial chromatic aberration cannot be stably corrected. For example, depending on the type of interpolation algorithm, the amount of creation of a color artifact due to the image structure is greater than the amount of creation of color bleeding due to axial chromatic aberration, making detection impossible. In case where filtering is used too much in order to suppress the color artifact, local color bleeding due to axial chromatic aberration extends widely, so that the image is restored in an MTF state that is quite different from the original MTF state.

In addition, with the conventional device, the parameter of the variable filter is searched so that the correlation between the color planes becomes maximal. However, no specific technique as to how to interpret such correlation has been disclosed.

Further, with the conventional device, even if an image is sharpened with respect to a certain color component plane, a microstructure having Nyquist frequency that has originally been lost due to defocusing is not restored, and it is impossible to match MTFs of the color component with those of microstructure resolved with another color component, so that the MTFs remain in a mismatched state. This may rather cause an even more unnatural color artifacts or false structure to occur. That is, with the conventional device, the state of MTFs is changed through smoothing or sharpening of the image in a single color component plane and, hence, there arises a problem that MTF restoration with respect to an image structure portion that can not be predicted in the single color component cannot be dealt with.

Means for Solving the Problems

According to the 1st aspect of the present invention, an image processing device that converts a first image captured via an optical system in which at least one of a plurality of color components is missing in one pixel and MTF characteristics are different between a reference color component and at least one missing color component at an imaging plane, into a second image in which MTF characteristics are matched, comprises: an image creation unit that acquires information concerning differences in MTF characteristics between the missing color component and the reference color component in a pixel having the missing color component of the first image and creates the second image by using the acquired information.

According to the 2nd aspect of the present invention, in the image processing device according to the 1st aspect, it is preferred that the image creation unit creates the second image in which at least the missing color component is interpolated in each pixel while performing correction using the acquired information so that the missing color component is matched to the reference color component with respect to MTF characteristics.

According to the 3rd aspect of the present invention, in the image processing device according to the 1st aspect, it is preferred that the image creation unit corrects MTF characteristics of the missing color component of the first image so as to match to MTF characteristics of the reference color component using the acquired information to create the second image having the same arrangement of color components as an arrangement of color components of the first image.

According to the 4th aspect of the present invention, in the image processing device according to the 3rd aspect, it is preferred that the image processing device further comprises an interpolation unit that interpolates the missing color component of the second image.

According to the 5th aspect of the present invention, in the image processing device according to any one of the 2nd to 4th aspects, it is preferred that: the image creation unit includes a smoothing unit that smoothes a pixel having the reference color component so that MTF characteristics of the reference color components approach to MTF characteristics of at least one missing color component of the first image having different MTF characteristics; and based on a result smoothed by the smoothing unit, the MTF characteristics of the missing color component of the first image are matched to the MTF characteristics of the reference color component.

According to the 6th aspect of the present invention, in the image processing device according to the 5th aspect, it is preferred that the smoothing unit performs smoothing processing on the reference color component of the first image in order to create a chrominance component used for creating the second image but does not perform the smoothing processing on the reference color component of the first image for creating a luminance component to be used for creating the second image.

According to the 7th aspect of the present invention, in the image processing device according to the 1st aspect, it is preferred that a color component of the first image that bears luminance information is made to correspond to the reference color component of the first image.

According to the 8th aspect of the present invention, in the image processing device according to the 1st aspect, it is preferred that a color component of the first image that is arranged in the highest density is made to correspond to the reference color of the first image.

According to the 9th aspect of the present invention, in the image processing device according to the 1st aspect, it is preferred that the information concerning differences in MTF characteristics is decided based on external information concerning conditions of the optical system upon photographing.

According to the 10th aspect of the present invention, in the image processing device according to the 9th aspect, it is preferred that the external information concerning the conditions of the optical system upon photographing includes at least one piece of information on a type of lens, focus position, aperture value, and focus position in the image.

According to the 11th aspect of the present invention, in the image processing device according to the 5th or 6th aspect, it is preferred that the smoothing unit decides a degree of smoothing for each pixel.

According to the 12th aspect of the present invention, in the image processing device according to the 5th or 6th aspect, it is preferred that the smoothing unit decides a common degree of smoothing to be applied over a plurality of pixels.

According to the 13th aspect of the present invention, in the image processing device according to the 6th aspect, it is preferred that when creating a plurality of chrominance components that represent different color information on one pixel, the smoothing unit decides a degree of smoothing of the smoothing processing for each color component of the first image that constitutes each type of chrominance component.

According to the 14th aspect of the present invention, an image processing device that converts a first image captured via an optical system in which one pixel has at least one of a plurality of color components and MTF characteristics are different between at least two color components at an imaging plane, into a second image in which MTF characteristics are matched, comprises: an MTF correction unit that performs smoothing or sharpening processing to one of the at least two color components of the first image to correct MTF thereof; a comparison unit that performs a plurality of ways of processing for correcting the MTF and compares color responses therebetween; a decision unit that decides one MTF correction processing out of the plurality of ways of processing for correcting the MTF based on a result of comparing the color responses by the comparison unit; and an image conversion unit that matches MTF characteristics of one color component out of the at least two color components to MTF characteristics of the other color component based on a result of performing the one MTF correction processing decided by the decision unit.

According to the 15th aspect of the present invention, an image processing device that converts a first image captured via an optical system in which one pixel has at least one of a plurality of color components and MTF characteristics are different between at least two color components at an imaging plane, into a second image in which MTF characteristics are matched, comprises: a smoothing unit that performs smoothing processing to one color component out of the at least two color components of the first image at a plurality of smoothing degrees including a case in which no smoothing processing is performed; a comparison unit that compares color responses in response to changes in MTF characteristics between a plurality of cases in which the smoothing processing is performed at the plurality of smoothing degrees; a decision unit that decides one smoothing degree out of the plurality of smoothing degrees based on a result of comparing the color responses by the comparison unit; and an image conversion unit that matches MTF characteristics of one color component out of the at least two color components to MTF characteristics of the other color component based on a result of performing the smoothing processing at the one smoothing degree decided by the decision unit.

According to the 16th aspect of the present invention, in the image processing device according to the 14th or 15th aspect, it is preferred that the comparison unit creates a plurality of types of chrominance components in each pixel of each image on which the smoothing processing has been performed at the plurality of smoothing degrees and compares the color responses based on the created chrominance components.

According to the 17th aspect of the present invention, in the image processing device according to the 16th aspect, it is preferred that the comparison unit calculates a plurality of indices concerning saturation based on the plurality of types of chrominance components in each pixel of each image on which the smoothing processing has been performed at the plurality of smoothing degrees and compares the indices concerning saturation to thereby compare the color responses.

According to the 18th aspect of the present invention, in the image processing device according to the 17th aspect, it is preferred that the decision unit decides a smoothing degree that gives a lowest saturation level based on the plurality of indices concerning saturation as the smoothing degree on the color components of the first image for conversion into the second image.

According to the 19th aspect of the present invention, in the image processing device according to any one of the 16th to 18th aspects, it is preferred that the comparison unit uses the created chrominance components having undergone correction processing with chrominance components of peripheral pixels, as the chrominance components when the smoothing processing is not performed.

According to the 20th aspect of the present invention, in the image processing device according to the 14th or 15th aspect, it is preferred that the decision unit creates a plurality of types of chrominance components that represent different color information for one pixel and decides the smoothing degree taking into consideration new chrominance information formed by combinations of the plurality of types of the chrominance components.

According to the 21st aspect of the present invention, in the image processing device according to the 20th aspect, it is preferred that the decision unit decides the smoothing degree in the smoothing processing for each color component of the first image that constitutes each type of chrominance component when a plurality of types of chrominance that represent different color information are created for one pixel.

According to the 22nd aspect of the present invention, in the image processing device according to any one of the 14th to 21st aspects, it is preferred that the decision unit decides a smoothing degree for each pixel.

According to the 23rd aspect of the present invention, in the image processing device according to any one of the 14th to 21st aspect, it is preferred that the decision unit decides a common smoothing degree to be applied over a plurality of pixels.

According to the 24th aspect of the present invention, in an image having a state in which MTF characteristics are mismatched between color components due to misalignment of foci of the color components in a direction of an optical axis, color information of a color component having low MTF characteristics is corrected using color information of a color component having high MTF characteristics to match MTF characteristics between the color components.

According to the 25th aspect of the present invention, in the image processing device according to the 1st aspect, it is preferred that a signal of the color component having high MTF characteristics is smoothed, and MTF characteristics of the color component having low MTF characteristics are corrected based on correction information obtained from a difference between a non-smoothed signal of the color component having high MTF characteristics and a smoothed signal of the color component having the high MTF characteristics to match MTF characteristics between each color component.

According to the 26th aspect of the present invention, an image processing device that converts a first image captured via an optical system having a plurality of color components in which MTF characteristics are different between at least two color components at an imaging plane, into a second image, comprises: a smoothing unit that performs smoothing processing in a pixel having one color component of the at least two color components so as to make MTF characteristics of the one color component to approach to MTF characteristics of the other color component; a chrominance component creation unit that creates a chrominance component of the second image using the one color component smoothed by the smoothing unit; and a luminance component creation unit that creates a luminance component of the second image using a color component of the first image that has not been smoothed.

According to the 27th aspect of the present invention, in the image processing device according to the 26th aspect, it is preferred that the image processing device further comprises an inverse conversion unit that converts the second image into an image of a color system having the same plurality of color components as the first image using the chrominance component and luminance component of the second image.

According to the 28th aspect of the present invention, in the image processing device according to the 26th or 27th aspect, it is preferred that the smoothing unit decides a degree of smoothing of the smoothing processing for each chrominance component when a plurality of types of chrominance components is created.

According to the 29th aspect of the present invention, in the image processing device according to any one of the 26th to 28th aspects, it is preferred that the smoothing unit performs smoothing processing at each degree of smoothing for each pixel.

According to the 30th aspect of the present invention, in the image processing device according to any one of the 26th to 28th aspects, it is preferred that the smoothing unit performs smoothing processing at a common degree of smoothing over a plurality of pixels.

According to the 31st aspect of the present invention, in the image processing device according to any one of the 26th to 30th aspects, it is preferred that the first image has all the color components in each pixel.

According to the 32nd aspect of the present invention, an image processing method for creating an image having matched MTF characteristics, comprises: capturing a first image having a plurality of color components in which the MTF characteristics are different between at least two color components at an imaging plane; performing a plurality of ways of smoothing processing on one color component out of the at least two color components of the first image; creating a plurality of chrominance components using the one color component on which the smoothing processing has not been performed and the one color component on which the plurality of series of the smoothing processing has been performed; selecting, from the plurality of chrominance components, a chrominance component that represents a state in which the MTF characteristics are most matched between the one color component and the other color component; and creating a second image in which the MTF characteristics of the plurality of color components are matched using the selected chrominance component and the captured first image.

According to the 33rd aspect of the present invention, in the image processing method according to the 32nd aspect, it is preferred that: the image processing method further comprises acquiring saturation using the plurality of created chrominance components; and selecting a chrominance component used when the acquired saturation is lowest, as a chrominance component that represents a state in which the MTF characteristics are most matched between the one color component and the other color component.

According to the 34th aspect of the present invention, in the image processing method according to the 32nd aspect, it is preferred that the image processing method further comprises acquiring a luminance component from the captured first image; and creating a second image in which the MTF characteristics of the plurality of color components are matched using the selected chrominance component and the acquired luminance component.

Advantageous Effect of the Invention

According to the first invention, MTF is matched using not an interpolated color image but a color image before interpolation processing, i.e., an image as it is in a state where at least one of a plurality of color components is missing in one pixel, so that axial chromatic aberration can be stably corrected with accuracy without being affected by the interpolation processing algorithm used.

According to the second invention, color responses to a change in MTF characteristics are compared between images subjected to smoothing processing at a plurality of smoothing degrees and based on results of the comparison, the degrees of smoothing to color components of the first image can be decided with high accuracy.

According to the third invention, MTF characteristics are matched by correcting the color information of a color component having low MTF characteristics using the color information of a color component having high MTF characteristics, so that MTF restoration of a frequency component that is impossible to restore with a single color component becomes possible, thus enabling high-definition axial chromatic aberration.

According to the fourth invention, axial chromatic aberration is performed on only the chrominance components using color signals after being subjected to smoothing for MTF matching while luminance components on which an influence of axial chromatic aberration is not so conspicuous are created using original color signals without smoothing, so that correction that is highly resistant to destruction of image data structure while maintaining sharpness becomes possible.

BRIEF DESCRIPTION OF THE DRAWINGS

FIG. 2 is a first diagram illustrating a principle according to which color bleeding due to axial chromatic aberration occurs;

FIG. 5 is a diagram illustrating a specific example of a Bayer image;

FIG. 6 is a diagram illustrating a specific example of a smoothing filter used in the first embodiment;

FIG. 7 is a diagram illustrating specific examples of "image without blurring", "image with weak blurring", and "image with strong blurring";

FIG. 9 is a diagram illustrating a specific example of a Bayer image of which MTF is matched;

FIG. 11 is a diagram illustrating a specific example of a smoothing filter used in a third embodiment;

FIG. 12 is a diagram illustrating specific examples of "image without blurring" and "image with blurring" in the third embodiment;

FIG. 15 is a diagram illustrating relationship between a distance of the camera to a subject and an LPF used;

BEST MODE FOR CARRYING OUT THE INVENTION

-First Embodiment-

According to a first embodiment, there is provided a method in which no optical information concerning axial chromatic aberration is prepared in advance and such information is self-detected from an image itself for correcting the axial chromatic aberration. A self-detection method for detecting chromatic aberration of magnification, which is aberration in a lateral direction, can be performed relatively easily by measuring similarity in a spatial direction between R, G and B planes. On the other hand, it is not obvious what should be used as an indicator for the self-detection method for detecting axial chromatic aberration, which is aberration in a longitudinal direction. Accordingly, a technique therefor is indicated below. This technique makes it possible to cope with axial chromatic aberration varying depending on the distance of the subject even when the condition of the lens is the same. That is, a measure can be taken for a situation where a nearer subject tends to be in a red color cast and a farther subject tends to be in a blue color cast in a landscape photograph with focus being at infinity or for a situation where there occurs an abrupt change in response to axial chromatic aberration due to a difference in an anteroposterior position relationship on the order of centimeters of the position of a subject with respect to a point of focus of the lens in closeup photography.

Figure 1:
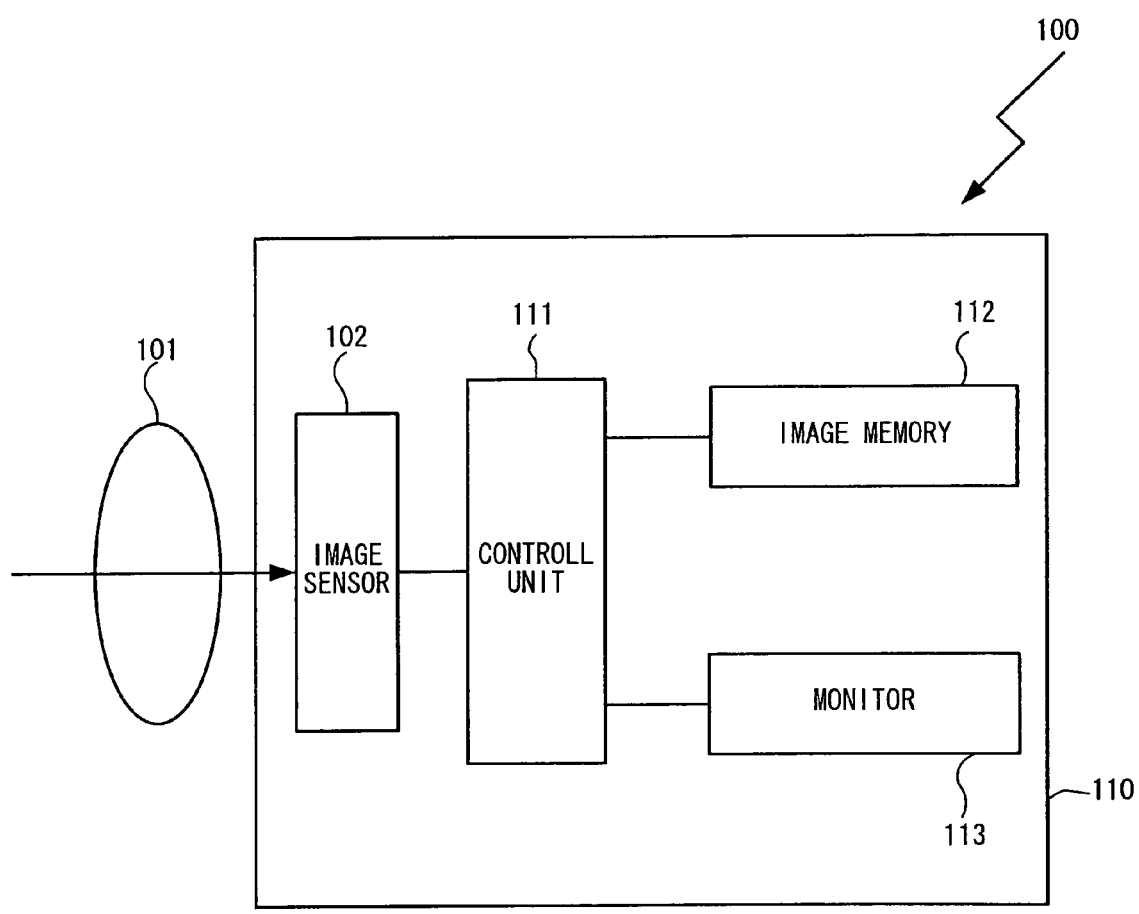
FIG. 1 is a block diagram showing a construction of an image processing device as mounted on a digital camera according to one embodiment of the present invention.

FIG. 1 is a block diagram presenting a configuration of an image processing device as mounted on a digital camera according to a first embodiment of the present invention. A digital camera 100 includes a lens 101, an image sensor 102 constituted by a CCD and the like, and an image processing device 110. In the image sensor 102, for example, color filters of R (red), G (green) and B (blue), which are most typical filters of a single-plate color image sensor, are arranged in a Bayer array. An image data captured by the image sensor 102 is expressed in an RGB color system and color information on any one of color components R, G and B is supposed to be present in each pixel that forms the image data. That is, the image is supposed to be a Bayer image.

The image processing device 110 includes a controlling unit 111 having a CPU and peripheral circuits for performing the image processing detailed below, an image memory 112 that stores an image captured by the image sensor 102, and a monitor 113 that displays the image having undergone the image processing. In this digital camera, the image data of the Bayer image captured by the image sensor 102 through the lens 101 is A/D converted into a digital signal and stored in the image memory 112.

As described above, there is a possibility that color bleeding due to axial chromatic aberration may occur in the image data captured by the image sensor 102 and stored in the image memory. That is, when an image of an achromatic black line subject is captured, no blurred signal is created in each component of R, G and B as shown in FIG. 2(a) if no axial chromatic aberration is present. However, if a large axial chromatic aberration is present in the R component on the focusing plane, a blurred signal is created in the R component as shown in FIG. 2(b). That is, the signals of the G and B components are distinct color component signals, whereas the signal of the R component becomes a blurred color component signal.

In this case, the blurred signal created in the R component extends around the position of the black line subject to elevate the signal level of red alone, resulting in that the captured image is a reddish line. In particular, red bleeding occurs in the vicinity of the edge of the black line subject. Note that when a large axial chromatic aberration is present in the B component, blue bleeding occurs, whereas when a large axial chromatic aberration is present in both R and B, magenta bleeding occurs.

Such images are captured generally using a single-plate image sensor of the type of a Bayer array and missing color components are interpolated to cause interpolation algorithm dependence, leading to a more complex situation. A higher performance algorithm tends to reproduce axial chromatic aberration more faithfully. Accordingly, in the present embodiment, the luminance component is interpolated in the same manner as is done conventionally with the image being in a Bayer array as it is, which is free of interpolation algorithm dependence, in order to prevent the image from loosing sharpness. On the other hand, in the creation of chrominance (color difference) components, conversion is performed so as to reduce differences in the MTF characteristics by matching the MTF characteristics of the color components other than the blurred color component to the MTF characteristics of the blurred color component, and then the conventional chrominance component creation processing is performed, thereby preventing color bleeding due to axial chromatic aberration from occurring.

Here, explanation is made on the principle that the above-mentioned color bleeding due to axial chromatic aberration occurs when an image of an achromatic black line subject is captured. When an image of an achromatic black line is captured via an optical system, if no axial chromatic aberration is present, each of R, G and B components is in a state where it has a matched focus on the imaging plane as shown in FIG. 3(a), that is, in a state where the MTF characteristics are matched between each of R, G and B components as shown in FIG. 3(b). On the contrary, if axial chromatic aberration is present in the R component, only the focus of the R component is deviated from the imaging plane as shown in FIG. 3(c) and the MTF characteristics are mismatched on the imaging plane as shown in FIG. 3(d).

In the first embodiment, when axial chromatic aberration is present in any color component of R, G and B and color bleeding occurs due to this, the controlling device 111 corrects mismatch of the MTF characteristics between each color component to resolve the color bleeding due to the axial chromatic aberration. That is, the axial chromatic aberration is resolved by making the MTF characteristics of each color component to become identical with each other or to approach to each other. In concrete terms, the color bleeding due to axial chromatic aberration is resolved by the following principle.

Figure 4:
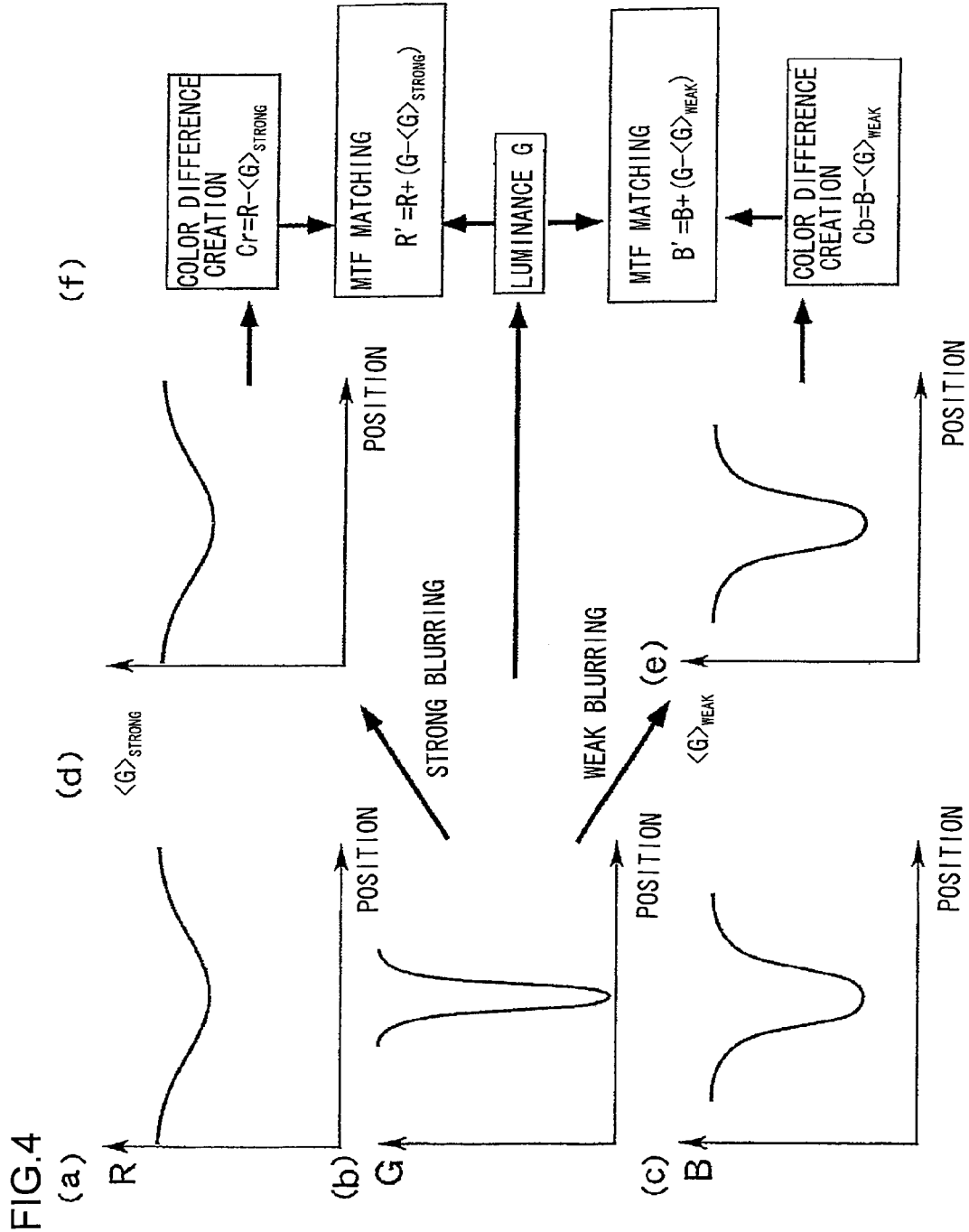
FIG. 4 is a diagram illustrating a principle according to which axial chromatic aberration of each of R and B components is corrected utilizing another color component (G component)

For example, for an image having signal levels of R, G and B components as shown in FIGS. 4(a) to 4(c), respectively, the MTF characteristics of blurred color component signals such as those of the R and B components are sharpened utilizing the MTF characteristics of a highly defined color component signal such as that of the G component to match the MTFs. For this purpose, first, the image is smoothed and blurred by selecting a highly defined color component signal as a reference color component and making the MTF characteristics of the reference color component to approach to or become identical with the MTF characteristics of a blurred color component signal. That is, in the example shown in FIG. 4, the MTF characteristics of the G component is smoothed so as to approach to the respective MTF characteristics of the R and B components.

As a result, $<G>_{strong}$ that is strongly blurred so that the MTF characteristics of the G component approach to the MTF characteristics of the R component as shown in FIG. 4(d) and $<G>_{weak}$ that is blurred weakly so that the MTF characteristics of the G component approach to the MTF characteristics of the B component as shown in FIG. 4(e) are obtained. Then, chrominance components Cr and Cb are created by using smoothed G components obtained by smoothing the G component in correspondence to the R and B components, respectively, i.e., $<G>_{strong}$ and $<G>_{weak}$, as shown in FIG. 4(f).

Subsequently, the expression of the image is returned to the RGB color system based on the created chrominance components Cr and Cb and the original G component that has received no smoothing. In this manner, the MTF characteristics of each of the R, G, and B components can be made to be identical with each other or to approach to each other to follow the MTF characteristics of the G component. In other words, the MTF characteristics of each of the R, G, and B components are matched to the MTF characteristics of highly defined G component by adding a difference between the G component and $<G>_{strong}$ and a difference between the G component and $<G>_{weak}$, $<G>_{strong}$ and $<G>_{weak}$ being obtained by smoothing at different smoothing degrees, to the R and B components, respectively.

That is, the axial chromatic aberration in each of the R and B components can be corrected by utilizing the other color component (G component) having higher MTF characteristics by correcting the R component according to expression (1) and the B component according to expression (2).

$$R' = R + (G - <G>_{strong}) \quad (1)$$

$$B' = B + (G - <G>_{weak}) \quad (2)$$

In this manner, the microstructure information that cannot be restored from the color component having low MTF characteristics alone can be restored by utilizing other color components having higher MTF characteristics, thus enabling nonconventional high-definition axial chromatic aberration correction. In addition, since chrominance components are created by performing axial chromatic aberration correction on only chrominance components using color signals having undergone smoothing for matching the MTF and the luminance component is created by using original, nonsmoothed color signals, correction which retains sharpness and gives less damage to the image structure is possible.

Hereinafter, detailed explanation will be made on processing by which the mismatch of MTF characteristics between each component is corrected to resolve color bleeding due to axial chromatic aberration.

(1-1) Inputting a Bayer Image

First, a Bayer image captured by the image sensor 102 is read from the image memory 112 and used as an object for image processing. Note that in each pixel [i,j] of the Bayer image, color information on any one of color components R, G and B, that is, a color component value (value corresponding to the signal value on the CCD) is present. [i,j] indicates coordinates for indicating the position of the pixel.

(1-2) Direction Decision

In the same manner as in the conventional interpolation system, direction judgment of similarity in R/B pixel position is performed using the Bayer image. Note that in the first embodiment, the direction judgment is performed by a generally known method as explained below.

(1-2-1) Calculation of Similarity Degree

Similarity degree in the vertical direction Cv[i,j] and similarity degree in the horizontal direction Ch[i,j] for each of the R and B positions are calculated by the following expressions (3) and (4), respectively.

$$Cv[i,j] = \{(|G[i,j-1] - Z[i,j]| + |G[i,j+1] - Z[i,j]|)/2 + |G[i,j-1] - G[i,j+1]|\}/2 \quad (3)$$

$$Ch[i,j] = \{(|G[i-1,j] - Z[i,j]| + |G[i+1,j] - Z[i,j]|)/2 + |G[i-1,j] - G[i+1,j]|\}/2 \quad (4)$$

Note that in the expressions (3) and (4), Z represents R or B.

(1-2-2) Similarity Judgment

Then, the similarity degrees are compared and converted into direction indices based on the following conditional expression (5).

If $|Cv[i,j] - Ch[i,j]| = <Th1$ THEN $HV[i,j] = 0$: vertical and horizontal similarities unclear else if $Cv[i,j] < Ch[i,j]$ THEN $HV[i,j] = 1$: vertical similarity else $HV[i,j] = -1$ THEN: horizontal similarity  (5)

Note that threshold Th1 assumes a value around 10 in the case of 256 gradations and is set higher when more noise is present in the image.

(1-3) Preparation of a Plurality of Types of Blurred Bayer Images

To perform MTF matching between color components R, G, and B, a plurality of types of blurred images for each color component are created. However, in the present embodiment, MTFs of the R and B components are considered to be already inferior as a result of Bayer sampling because of a high arrangement density of the G component that represents luminance in the Bayer array, so that it is only needed to perform a plurality of types of blurring (smoothing) on the G component. Therefore, two types of blurred images are created on the G component using a weak smoothing filter (FIG. 6(a)) and a strong smoothing filter (FIG. 6(b)) as typically shown in FIG. 6. Note that more, finer blurring types may be provided or intermediate states to be obtained by linear combination of the original image with these blurred images may also be conceived.

Figure 6:
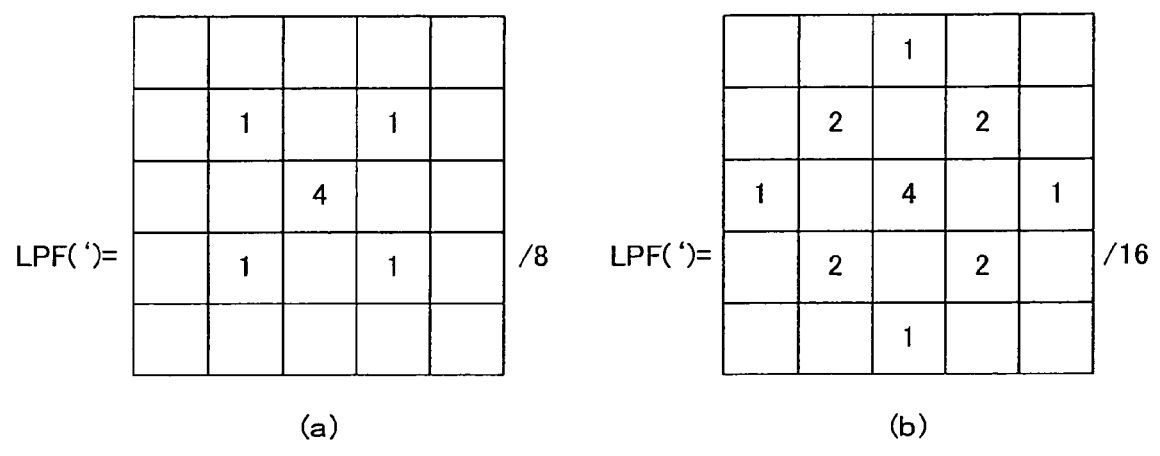

As described above, blurred images are created using the two types of smoothing filters as shown in FIG. 6 to provide three types of Bayer images, i.e., "Bayer0: Image without blurring" shown in FIG. 7(a), "Bayer 1: Image with weak blurring" shown in FIG. 7(b) (a blurred image created using the weak smoothing filter shown in FIG. 6(a)), and "Bayer2: Image with strong blurring" shown in FIG. 7(c) (a blurred image created using the strong smoothing filter shown in FIG. 6(b)). That is, smoothing is performed at a plurality of smoothing degrees inclusive of the case where no blurring is performed.

(1-4) Creation of a Plurality of Temporary Chrominance Planes by Combination of Blurring Types Using the three types of G planes in each image obtained in (1-3) above, three types of chrominance planes, Cr planes and Cb planes, are prepared for each pixel. That is, assuming Cr planes prepared by using the R signal and G, G', and G" signals of Bayer are Cr0, Cr1, and Cr2, respectively, and Cb planes prepared by using the B signal and G, G', and G" signals of Bayer are Cb0, Cb1, and Cb2, respectively, three types of Cr planes and three types of Cb planes are prepared. The following expressions (6) to (11) schematically represent Cr0, Cb0, Cr1, Cb1, Cr2, and Cb2.

$$Cr0 = R - \langle G \rangle \quad (6)$$

$$Cb0 = B - \langle G \rangle \quad (7)$$

$$Cr1 = R - \langle G' \rangle \quad (8)$$

$$Cb1 = B - \langle G' \rangle \quad (9)$$

$$Cr2 = R - \langle G'' \rangle \quad (10)$$

$$Cb2 = B - \langle G'' \rangle \quad (11)$$

Among these, Cr0 plane is explained for its creation. In concrete terms, a Cr0 plane is created at the R position by the following conditional expression (12) and a Cr0 plane is interpolated at a position other than the R position by the expressions (13) to (16). Note that the rest Cr1, Cr2, Cb0, Cb1, and Cb2 planes can be calculated similarly.

If $HV[i,j]=1$ THEN $Cr0[i,j]=R[i,j]-(G[i,j-1]+G[i,j+1])/2$ else if $HV[i,j]=-1$ THEN $Cr0[i,j]=R[i,j]-(G[i-1,j]+G[i+1,j])/2$ else $Cr0[i,j]=R[i,j]-(G[i,j-1]+G[i,j+1]+G[i-1,j]+G[i+1,j])/4 \quad (12)$ Interpolate Cr0 plane at the B position $$Cr0[i,j]=(Cr0[i-1,j-1]+Cr0[i-1,j+1]+Cr0[i+1,j-1]+Cr0[i+1,j+1])/4 \quad (13)$$

Interpolate Cr0 plane at the G position (same lines as R rows)

$$Cr0[i,j]=(Cr0[i-1,j]+Cr0[i+1,j])/2 \quad (14)$$

Interpolate Cr0 plane at the G position (same lines as B rows)

$$Cr0[i,j]=(Cr0[i,j-1]+Cr0[i,j+1])/2 \quad (15)$$

Note that the creation method for chrominance planes is not limited to the above-mentioned method and the chrominance planes may be produced by any other known method.

(1-5) Preparation of Color Index

Then, a color index for comparing changes in color of imaginary color images that can be created from each of the blurred images in (1-3) mentioned above with each other, that is, saturation index, is prepared. As described above, when the mismatch of MTF due to axial chromatic aberration is reduced, this serves to decrease coloring or color bleeding at an edge portion due to axial chromatic aberration. Therefore, color indices are prepared taking into consideration of combinations of two types of blurring manners at chrominance planes Cr and Cb in order to exactly measure how coloring or color bleeding decreases.

Note that a color index means an index that indicates characteristics of the color of each pixel and is referenced in order to decide whether each pixel is of low saturation or of high saturation or an index for determining a color response of a color image that can be created when the MTF characteristics of an input image are changed. In other words, the color index is an index for monitoring how the color response is changed in response to the degree of smoothing for changing the MTF characteristics, that is, how the degree of color change is changed in response to the degree of smoothing for changing the MTF characteristics.

Here, by the term "color response" is meant a color response when observing which color an original color is changed to as a result of smoothing at any smoothing degree and by the term "change in color response" is meant respective changes in color response when smoothing is performed at a plurality of different smoothing degrees.

The smoothing referred to herein is used in a sense inclusive of midstream processing for obtaining correction signals for sharpening other color components through the expressions (1) and (2). In concrete terms, the color response of R'GB' image finally obtained when the blur amount of FIG. 4 is gradually changed is monitored. That is, smoothing processing also indicates unsharp processing for obtaining an MTF-corrected image by unsharp mask processing. More particularly, it can be said that to perform sharpening processing on the R and B components, smoothing processing is performed on the G component.

Assuming the color index to be prepared is Cdiff, its basic form is defined by the following expression (16). Note that while in the present embodiment, Cdiff is defined as a color index, for example, only a chrominance may be defined as a color index to be used.

$$Cdiff[i,j]=|Cr[i,j]|+|Cb[i,j]|+|Cr[i,j]-Cb[i,j]| \quad (16)$$

In the case of the color index defined in the expression (16) above, combinations of color indices to be evaluated for each way of blurring on two types of chrominance planes, Cr and Cb, are 9 types in total as expressed by the following expressions (17) to (25).

$$Cdiff\_r0b0[i,j]=|Cr0*[i,j]|+|Cb0*[i,j]|+|Cr0*[i,j]-Cb0*[i,j]| \quad (17)$$

$$Cdiff\_r1b0[i,j]=|Cr1[i,j]|+|Cb0[i,j]|+|Cr1[i,j]-Cb0[i,j]| \quad (18)$$

$$Cdiff\_r0b1[i,j]=|Cr0[i,j]|+|Cb1[i,j]|+|Cr0[i,j]-Cb1[i,j]| \quad (19)$$

$$Cdiff\_r1b1[i,j]=|Cr1[i,j]|+|Cb1[i,j]|+|Cr1[i,j]-Cb1[i,j]| \quad (20)$$

$$Cdiff\_r2b0[i,j]=|Cr2[i,j]|+|Cb0[i,j]|+|Cr2[i,j]-Cb0[i,j]| \quad (21)$$

$$Cdiff\_r0b2[i,j]=|Cr0[i,j]|+|Cb2[i,j]|+|Cr0[i,j]-Cb2[i,j]| \quad (22)$$

$$Cdiff\_r2b1[i,j] = ||Cr2[i,j]| + |Cb1[i,j]| + |Cr2[i,j] - Cb1[i,j]|| \quad (23)$$

$$Cdiff\_r1b2[i,j] = ||Cr1[i,j]| + |Cb2[i,j]| + |Cr1[i,j] - Cb2[i,j]|| \quad (24)$$

$$Cdiff\_r2b2[i,j] = ||Cr2[i,j]| + |Cb2[i,j]| + |Cr2[i,j] - Cb2[i,j]|| \quad (25)$$

When only the MTF of the R component is low, it is only needed to blur only the G component used for creating Cr. When the MTF of the B component is low, it is only needed to blur only the G component used for creating Cb. When the MTFs of the both components R and B are low, the G components used for creating the both must be blurred.

Here, only Cdiff_r0b0, in which no blurring of the G component is present in both R and B, does not use the values obtained by merely creating Cr and Cb, and does use Cr0* and Cb0* that are obtained by performing chrominance plane correction processing on Cr and Cb. This is intended to have the non-blurred values, which tend to provide safer solutions to variations in color indices accompanied by occurrence of color artifacts due to the image structure, used for stable color evaluation rather than the blurred values, which would be at higher risk. This is also intended to convert color indices evaluation values to those that could prevent destruction of an image structure, even if there is the image structure consisting of a pair of opposite colors, by intentionally decreasing the saturation of Cdiff_r0b0 to cope with blurred Cdiff that is likely to decrease saturation due to the image structure in contrast to the MTF match of axial chromatic aberration.

Examples of the chrominance plane correction processing on Cr0 and Cb0 include low-pass processing as indicated by the following expression (26).

$$\begin{aligned} Cr*[i, j] = \{ &36 \times Cr[i, j] + 24 \times (Cr[i-2, j] + Cr[i+2, j] + \\ &Cr[i, j-2] + Cr[i, j+2]) + 16 \times (Cr[i-2, j-2] + Cr[i+2, j-2] + Cr[i-2, j+2] + \\ &Cr[i+2, j+2]) + 6 \times (Cr[i-4, j] + Cr[i+4, j] + Cr[i, j-4] + Cr[i, j+4]) + 4 \times \\ &(Cr[i-2, j-4] + Cr[i+2, j-4] + \\ &Cr[i-2, j+4] + Cr[i+2, j+4]) + (Cr[i-4, j-2] + Cr[i+4, j-2] + Cr[i-4, j+2] + Cr[i+4, j+2]) + (Cr[i-4, j-4] + \\ &Cr[i+4, j-4] + Cr[i-4, j+4] + \\ &Cr[i+4, j+4]) \} / 256 \end{aligned} \quad (26)$$

The chrominance correction processing is not limited to the low-pass processing indicated by the expression (26) above and as other methods, a median filter may be used or the range of the filter may be changed. While in the expression (26), an example in which Cr*[i,j] is calculated has been explained, Cb*[i,j] may be calculated similarly.

Note that since there is a possibility that information on a subtle change in blur amount due to mismatched MTF accompanied by aberration is lost by excessive filtering, it is preferred that comparison be made in the state immediately after the creation of chrominance planes. In light of this, the combinations of color indices other than Cdiff_r0b0 are defined so that no chrominance plane correction processing is performed thereon. In addition, Cdiff_r0b0 may also be defined so that no chrominance plane correction processing is performed thereon.

(1-6) Decision of Blur Amount

The chrominance planes created by eliminating MTF mismatch due to axial chromatic aberration are considered to have decreased color creation because of color bleeding and to be shifted toward the low saturation side. In the above-mentioned blurring processing, color indices are created on which a countermeasure of shifting the factors of interpolation color artifacts that would occur due to the image structure toward the low saturation side has been also applied in advance. Accordingly, the combination of Cr and Cb with blur amounts that could provide the lowest saturation level upon comparison of the color indices with each other may be defined as a blur amount to be finally utilized for image creation. That is, according to the conditional expression indicated by the following expression (27), the color index that has the minimum value is extracted out of Cdiff_r0b0 to Cdiff_r2b2 for each pixel and it is judged for each pixel which one of G, G' and G" the blur amount used for creating Cr and Cb at that time is, so that a discrete blur amount to be finally utilized for image creation, that is, degree of smoothing, can be decided.

(G Blur amount when creating Cr, G blur amount
when creating Cb)=arg min (Cdiff_r0b0,
Cdiff_r1b0, ... , Cdiff_r2b2) (G,G', G" for Cr),
(G, G', G" for Cb)     (27)

This enables evaluating each of the created color indices in the unit of pixel and deciding which color component and how much is to be blurred at which chrominance plane for each pixel. This also enables coping with the case in which the state of axial chromatic aberration is changed depending on the distance of the subject.

(1-7) Creation of Actual Chrominance Plane

By using the G component having a discrete blur amount decided pixel by pixel by the above-mentioned processing as information concerning a difference in MTF characteristics, chrominance components Cr[i,j] and Cb[i,j] used for a final output image are acquired as follows. First, a Cr value at the position of an R pixel is set according to the following expression (28) and a Cb value at the position of a B pixel is set according to the following expression (29).

$$Cr[i,j] = \text{one of } \{Cr0, Cr1, Cr2\} \text{ R position} \quad (28)$$

$$Cb[i,j] = \text{one of } \{Cb0, Cb1, Cb2\} \text{ B position} \quad (29)$$

Then, the Cr plane and the Cb plane are interpolated according to the above-mentioned expressions (13) to (15). Subsequently, chrominance plane correction is performed by using various types of conventional chrominance plane correction techniques. For example, an adaptive chrominance correction technique in which correction is performed or is not performed depending on the condition may be used. This is to incorporate color artifact suppression processing for suppressing color artifacts created during usual Bayer interpolation. In this way, Cr and Cb planes from which axial chromatic aberrations are eliminated, that is, actual chrominance planes are created.

(1-8) Creation of Actual Luminance Planes

Actual luminance planes are created using original Bayer signals without blurring processing. This is because luminance planes affected by not so much axial chromatic aberrations can be restored in a state where sharpened resolution is kept by use of the original Bayer signals. Note that in the present embodiment, the G plane is used as luminance as indicated by the following expression (30). However, the processing may be performed using the Y plane as luminance. Creation of luminance planes can be performed by various conventional methods. In addition, the luminance may be one that is directly created from the Bayer plane.

R/B Position on Bayer Plane if $HV[i,j]=1$ THEN $Gout[i,j]=(G[i,j-1]+G[i,j+1])/2+ (2 \times Z[i,j]-Z[i,j-2]-Z[i,j+2])/4$ else if $HV[i,j]=-1$ THEN $Gout[i,j]=(G[i-1,j]+G[i+1,j])/2+(2 \times Z[i,j]-Z[i-2,j]-Z[i+2,j])/4$ else $Gout[i,j]=(G[i,j-1]+G[i,j+1]+G[i-1,j]+G[i+1,j])/4+(4 \times Z[i,j]-Z[i,j-2]-Z[i,j+2]+Z[i,j]-Z[i-2,j]-Z[i+2,j])/8$ (30)

Note that in the expression (30), Z at the R position assumes Z=R, and Z at the B position assumes Z=B. In addition, Gout[i,j] of the G position on the Bayer plane is obtained by assigning the Bayer signal as it is to the expression (30).

(1-9) Color System Conversion

Conversion from the three pieces of color information, i.e., the Cr plane and Cb plane of which axial chromatic aberrations have been removed, and the G plane retaining sharpness by the above-mentioned processing, into the RGB color system is performed according to the following expressions (31) and (32).

$Rout[i,j]=Cr[i,j]+Gout[i,j]$ (31)

$Bout[i,j]=Cb[i,j]+Gout[i,j]$ (32)

The above-mentioned processing enables correction of mismatch of MTF characteristics between each color component to resolve color bleeding due to axial chromatic aberration when the read-in Bayer image has the axial chromatic aberration in any of color components R, G, and B and color bleeding occurs thereby. The RGB image of which the color bleeding due to the axial chromatic aberration has been resolved is output to the monitor 113 and displayed thereon.

Figure 8:
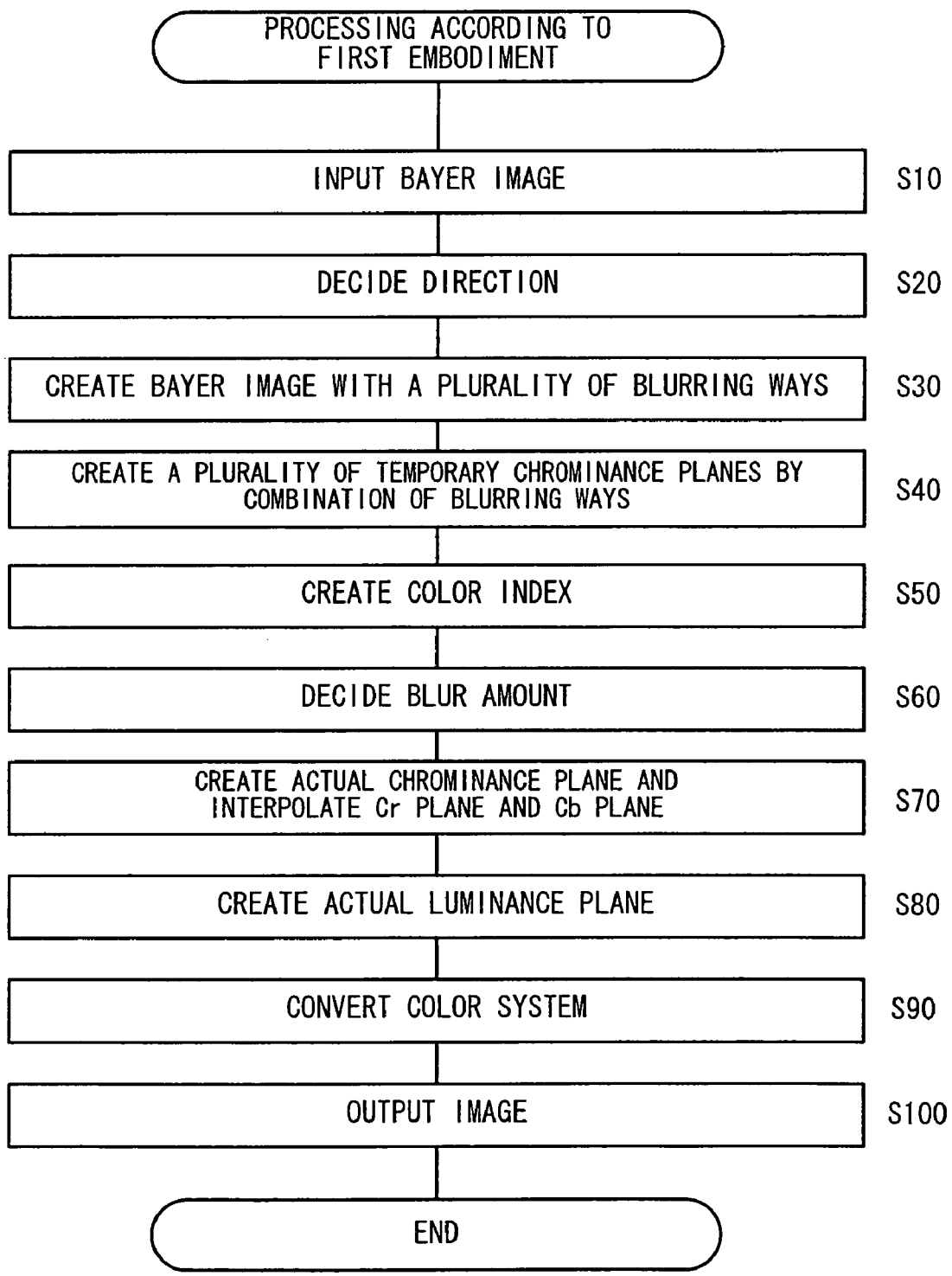
FIG. 8 is a flowchart illustrating an operation of the image processing device 110 in the first embodiment.

FIG. 8 is a flowchart illustrating an operation of the image processing device 110 in the first embodiment. The processing illustrated in FIG. 8 is executed by the controlling device 111 as a program that is started up when an image captured by the image sensor 102 via the lens 101 is stored in the image memory 112. In a step S10, as mentioned of in (1-1) above, the Bayer image captured by the image sensor 102 is read-in from the image memory 112 and the flow of control proceeds to a step S20. In the step S20, as mentioned of in (1-2) above, direction decision at R/B pixel position is performed using the Bayer image. Subsequently, the flow of control proceeds to a step S30.

In the step S30, a plurality of types of blurred image preparation processing mentioned of in (1-3) above is performed and the flow of control proceeds to a step S40. In the step S40, a plurality of types of temporary chrominance creation processing by combination of blurring mentioned of in (1-4) above is performed and the flow of control proceeds to a step S50. In the step S50, color index preparation processing mentioned of in (1-5) is performed and the flow of control proceeds to a step S60. In the step S60, as mentioned of in (1-6) above, a blur amount finally used for image creation is decided and the flow of control proceeds to a step S70.

In the step S70, the actual chrominance plane creation processing mentioned of in (1-7) above is performed and the flow of control proceeds to a step S80, where actual luminance plane creation processing mentioned of in (1-8) above is performed. Then, the flow of control proceeds to a step S90, where the color system conversion processing mentioned of in (1-9) above is performed to convert the three pieces of color information on the Cr plane and Cb plane from which axial chromatic aberrations have been removed and in which the G plane retains sharpness, to the RGB color system. Subsequently, the flow of control proceeds to a step S100, where an image of which color bleeding due to axial chromatic aberration has been resolved is output to the monitor 113 and the control flow of this routine terminates.

The first embodiment detailed above can provide the following effects.

(1) To avoid mismatch of MTF characteristics between each color component caused by axial chromatic aberration, the color component having high MTF is made to be matched to the color component having low MTF by blurring processing before chrominance components are created. This can prevent color bleeding that is created according to a difference in MTF caused by axial chromatic aberration.

(2) The correction amount for performing axial chromatic aberration correction on a captured image is decided based on the captured image itself. This enables the axial chromatic aberration correction to be performed by determining an appropriate correction amount for every pixel even when the characteristics of axial chromatic aberration vary depending on the distance of the camera to the subject.

(3) In addition, since the axial chromatic aberration correction can be performed by determining an appropriate correction amount by using the captured image itself, the axial chromatic aberration correction can be appropriately performed even when information concerning the image-capturing optical system is unclear.

(4) Upon preparation of color indices, Cr and Cb components having values just created are not used but instead Cr0* and Cb0*, that is, values of Cr and Cb components further subjected to chrominance plane correction processing, are used for only Cdiff_r0b0 having no blurring by the G component in both R and B. This enables color evaluation to be made stably on non-blurred values, which tend to provide safer solutions against variations in color indices accompanied by occurrence of color artifacts due to the Bayer sampling and the image structure rather than the values subjected to blurring processing, which would be at higher risk. In addition, it is possible to convert color indices evaluation values to those that could prevent destruction of an image structure, even if there is the image structure consisting of a pair of opposite colors, by intentionally decreasing the saturation of Cdiff_r0b0 to cope with blurred Cdiff that is likely to decrease saturation due to the image structure in contrast to the MTF match of axial chromatic aberration.

-Second Embodiment-

In the first embodiment described above, in "(1-7) Creation of actual chrominance plane", explanation has been made on the case where chrominance components Cr[i,j] and Cb[i,j] are obtained according to the expressions (28) and (29), which then the Cr plane and the Cb plane are interpolated according to the expressions (13) to (15), respectively, and then each processing of "(1-8) Creation of actual luminance planes" and "(1-9) Color system conversion" is performed.

On the other hand, in a second embodiment, after the chrominance components Cr[i,j] and Cb[i,j] are obtained according to the expressions (28) and (29), respectively, only the Cr plane at the R position and the Cb plane at the B position are used to perform each processing of "(1-8) Creation of actual luminance planes" and "(1-9) Color system conversion" to rewrite the original values of the R and B components. This enables obtaining an MTF-matched Bayer image before the interpolation processing, that is, a Bayer image of which axial chromatic aberration has been resolved.

Subsequently, the Bayer image of which axial chromatic aberration has been resolved is subjected to interpolation processing to obtain an RGB image having undergone the interpolation.

Figure 3:
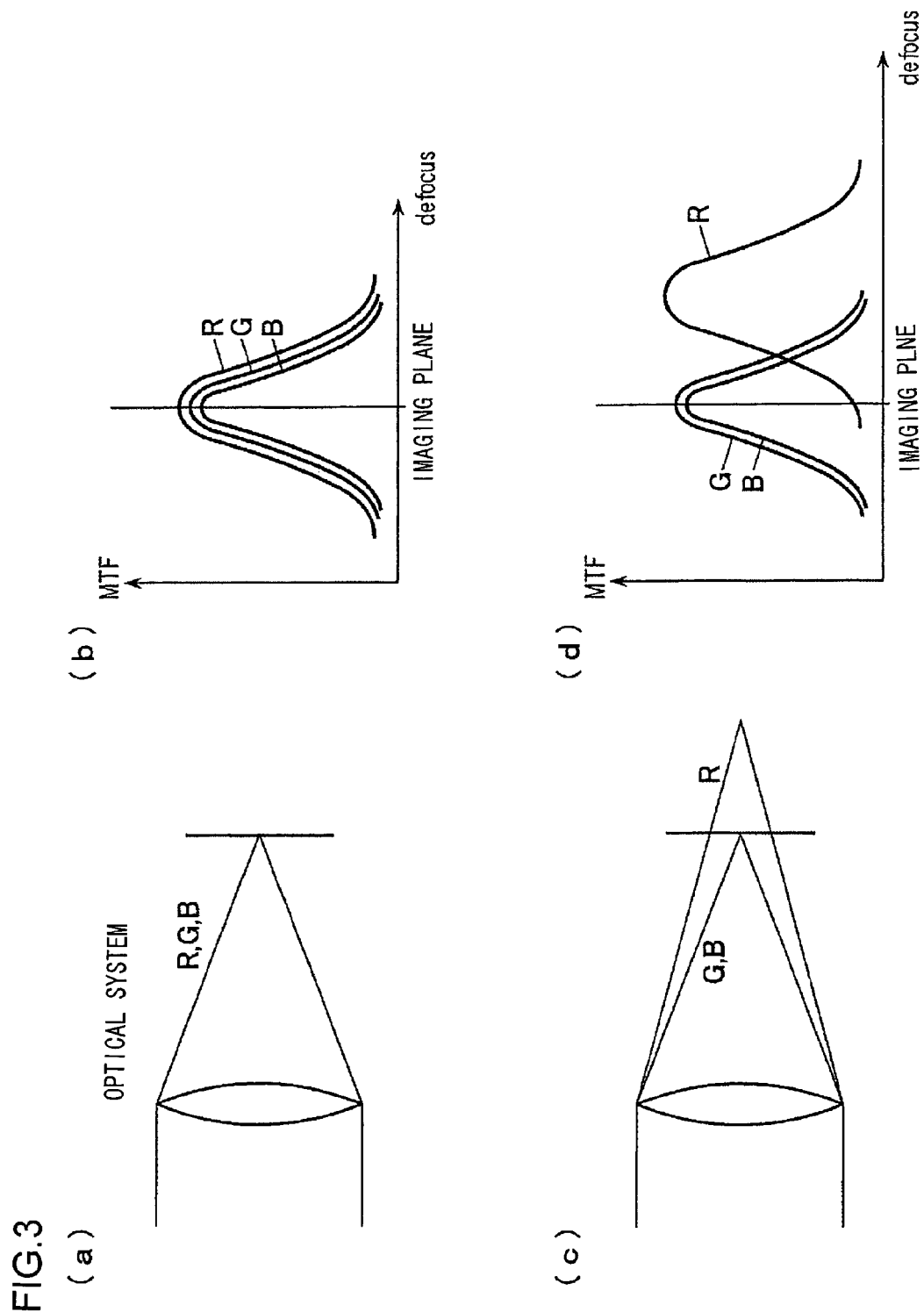
FIG. 3 is a second diagram illustrating a principle according to which color bleeding due to axial chromatic aberration occurs.

Note that the block diagram of FIG. 1 showing the digital camera 100 having mounted thereon the image processing device 100, the diagrams of FIGS. 2 and 3 each illustrating a principle according to which color bleeding due to axial chromatic aberration occurs, and the diagram of FIG. 4 illustrating a principle according to which axial chromatic aberration is corrected by matching MTF characteristics are the same as in the first embodiment and explanation thereon is omitted.

Figure 9:
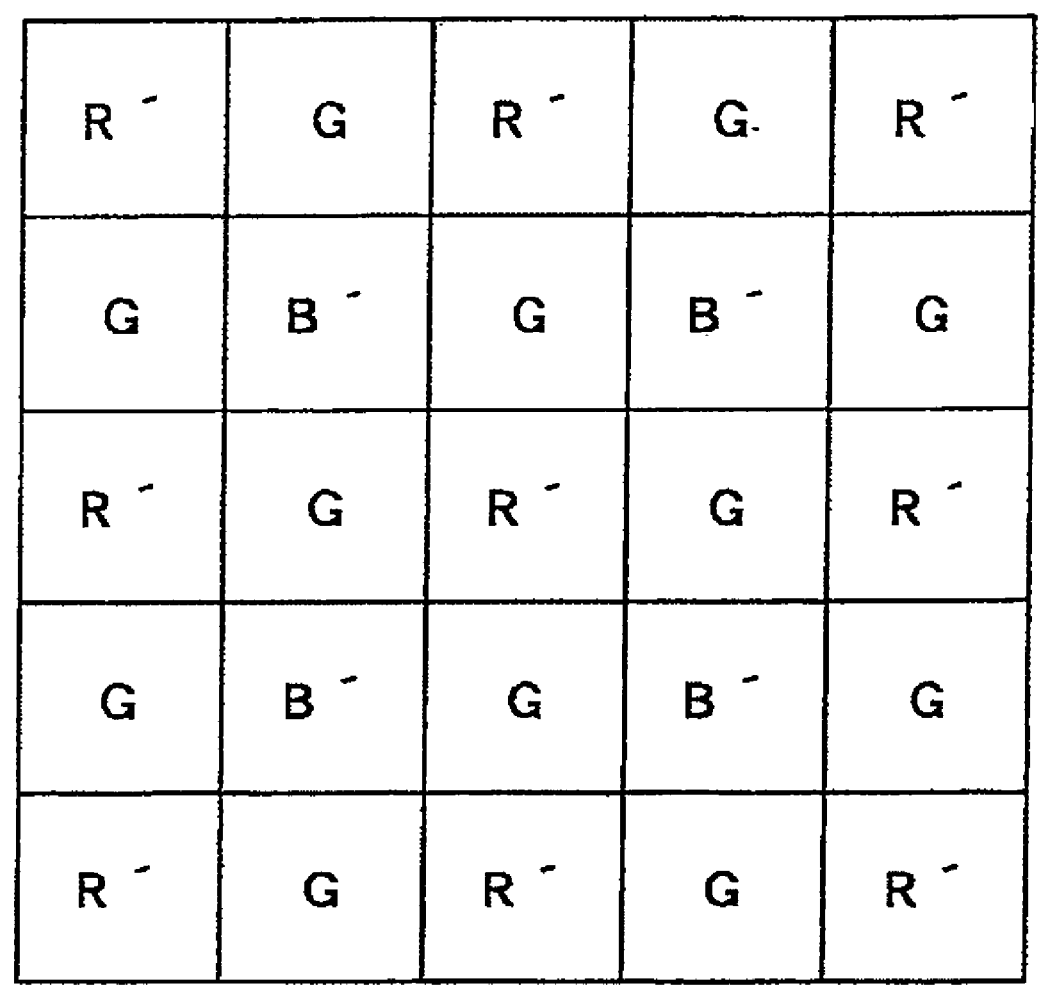

By performing each processing of "(1-8) Creation of actual luminance planes" and "(1-9) Color system conversion" using the Cr plane and the Cb plane having not undergone interpolation after the chrominance components Cr[i,j] and Cb[i,j] are obtained according to the expressions (28) and (29), respectively, an MTF-matched Bayer image, that is, a Bayer image of which axial chromatic aberration has been resolved as shown in FIG. 9 is output. Conventional interpolation processing performed on the Bayer image shown in FIG. 9 provides an RGB image having undergone the interpolation.

Figure 10:
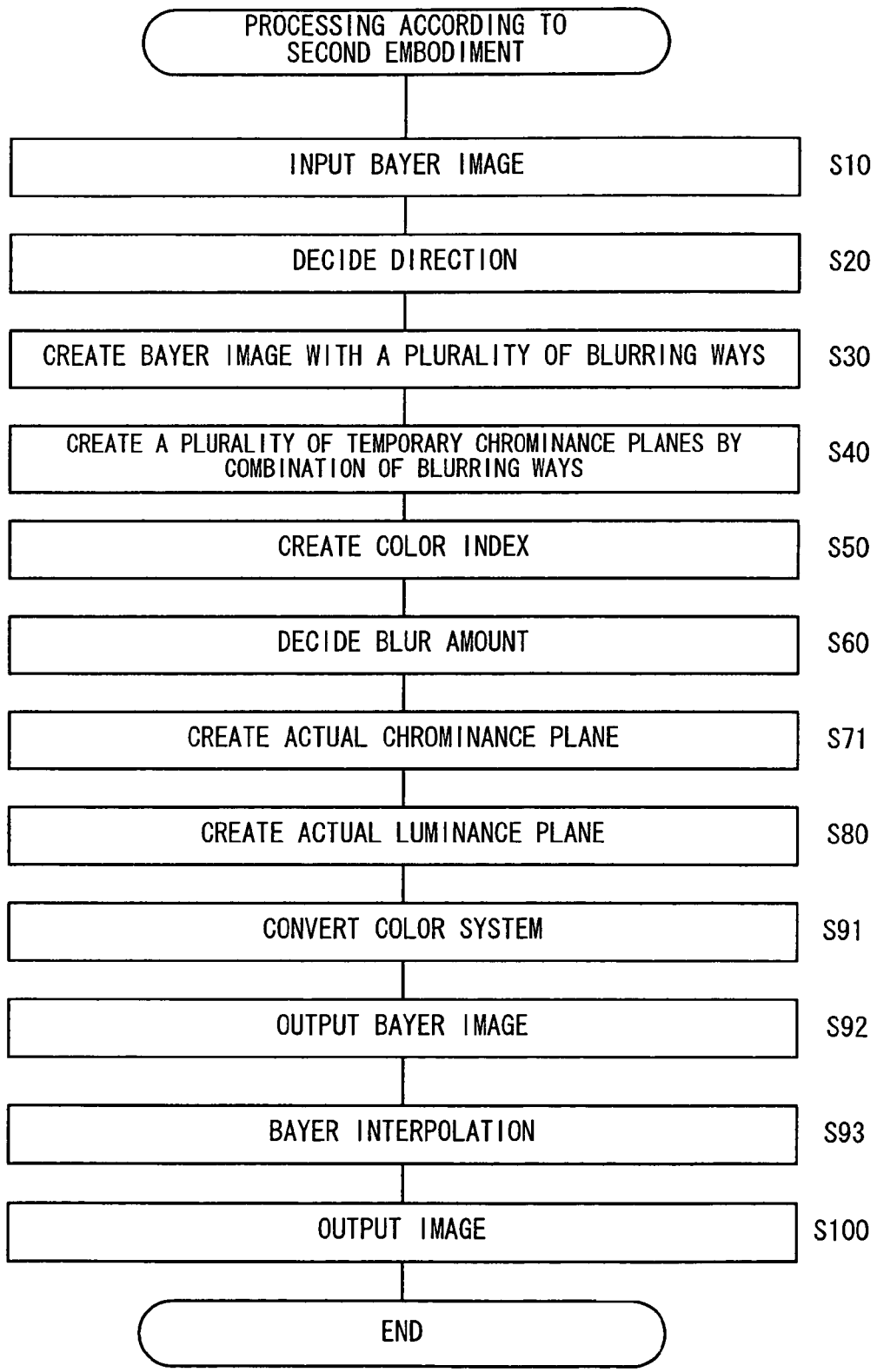
FIG. 10 is a flowchart illustrating an operation of the image processing device 110 in a second embodiment.

FIG. 10 is a flowchart illustrating processing by the processing device 110 in a second embodiment. The processing shown in FIG. 8 is executed by the controlling device 111 as a program that is started up when an image captured by the image sensor 102 via the lens 101 is stored in the image memory 112. Note that in FIG. 10, the same processing contents as those in the processing in the first embodiment shown in FIG. 8 are designated by the same step numbers and explanation is centered on differences.

In a step S71, chrominance components Cr[i,j] and Cb[i,j] are obtained according to the expressions (28) and (29), respectively, and the flow of control proceeds to the step S80. Subsequently, in a step S91, conversion from the three pieces of color information, i.e., the Cr plane and Cb plane from which axial chromatic aberration has been removed, and in which the G plane retains sharpness by the above-mentioned processing into the RGB color system is performed according to the expressions (31) and (32), respectively. Subsequently, the flow of control proceeds to a step S92. In the step S92, a Bayer image of which axial chromatic aberration has been corrected is output and the flow of control proceeds to a step S93, where a conventional Bayer interpolation processing is performed on the Bayer image to obtain an RBG image of which axial chromatic aberration has been corrected.

The above-mentioned second embodiment is different from the first embodiment in that the position at which the interpolation processing is executed in the axial chromatic aberration correction processing is changed so that interpolation processing can be performed after an MTF-matched Bayer image is once output. This enables handling the processing of correction of axial chromatic aberration and the interpolation processing separately one from another, so that various types of interpolation processing can be applied to the MTF-matched Bayer image.

-Third Embodiment-

While in the first and second embodiments, explanation has been made on axial chromatic aberration correction on image data before interpolation, such as a Bayer image captured by a single-plate color image sensor, in a third embodiment, correction is made of axial chromatic aberration of color images captured by a three-plate color image sensor or axial chromatic aberration of interpolated color images. That is, explanation is made on axial chromatic aberration of data of a color image in which all the information on each of color components R, G, and B is present in each pixel.

In concrete terms, the original color image data is divided into luminance and chrominance components and the data of a certain color component is blurred in a plurality of ways in the same manner as in the first embodiment in order to replace the data of the chrominance components by data without axial chromatic aberration. Then, among sets of chrominance components obtained by combining the blurred color component data, a combination of blurring ways that gives a color index having the lowest saturation is searched and the original chrominance component is replaced by the chrominance component obtained by such blurring.

Note that the block diagram of FIG. 1 showing the digital camera 100 having mounted thereon the image processing device 110, the diagrams of FIGS. 2 and 3 each illustrating a principle according to which color bleeding due to axial chromatic aberration occurs, and the diagram of FIG. 4 illustrating a principle according to which axial chromatic aberration is corrected by matching MTF characteristics are the same as in the first embodiment and explanation thereon is omitted. However, when a color image having all of R, G, and B components in each pixel is to be captured using a three-plate color image sensor, the image sensor 102 should be replaced from a single-plate image sensor to a three-plate color image sensor. In addition, in the third embodiment, blurring is performed not only to the G component but also to the R component and the B component. This makes it possible to correct axial chromatic aberration when the axial chromatic aberration is present on the G component.

(2-1) Inputting Color Images

In the third embodiment, the color image captured by the three-plate color image sensor and color images on which interpolation processing has been performed in advance are stored in a state where all of R[i,j], G[i,j], and B[i,j] are present in each pixel and the stored color image is read-in and made a target of image processing.

(2-2) Saving of Luminance Component by Conversion of Color System

The color system of the read-in color image is converted according to the following expression (33) to save the luminance component. That is, the luminance component of an image in a state before blurring is performed by the processing detailed below is saved in the memory space the controlling device 111 has.

$$Y[i,j]=(R[i,j]+2\times G[i,j]+B[i,j])/4 \tag{33}$$

(2-3) Preparation of a Plurality of Types of Blurred R, G, and B Plane Images

In the third embodiment, blurred images (R, G, and B plane images) are prepared on each of R, G, and B components using a smoothing filter shown in FIG. 11. Note that in the present embodiment, explanation is made on an example in which one smoothing filter as shown in FIG. 11 is used for the sake of simplicity of explanation. However, two types of filters, a weakly smoothing filter and a strongly smoothing filter, may be used to prepare R, G, and B plane images in the same manner as in the first embodiment.

Then, as shown in FIG. 12, images without blurring of each component of R, G and B in FIGS. 12(a) to 12(c), and images with blurring in FIGS. 12(d) to 12(f) prepared using the smoothing filter shown in FIG. 11 are used to perform the following processing.

(2-4) Creation of a Plurality of Types of Temporary Chrominance Planes by Combination of Blurring Ways Using the six types of R, G and B planes, i.e., the images without blurring in FIGS. 12(a) to 12(c) and the images with blurring in FIGS. 12(d) to 12(f), three types of Cr planes and three types of Cb planes are prepared for each pixel according to the following expressions (34) to (39), respectively.

$$Cr00 = R - G \tag{34}$$

$$Cb00 = B - G \tag{35}$$

$$Cr01 = R - G' \tag{36}$$

$$Cb01 = B - G' \tag{37}$$

$$Cr10 = R' - G \tag{38}$$

$$Cb10 = B' - G \tag{39}$$

(2-5) Preparation of Color Indices

For each way of blurring of Cr and Cb prepared according to the expressions (34) to (39), color indices to be evaluated, that is, combinations of indices concerning saturation are 9 ways in total as indicated by the following expressions (40) to (48).

$$Cdiff\_r00b00[i,j] = |Cr00[i,j]| + |Cb00[i,j]| + |Cr00[i,j] - Cb00[i,j]| \tag{40}$$

$$Cdiff\_r01b00[i,j] = |Cr01[i,j]| + |Cb00[i,j]| + |Cr01[i,j] - Cb00[i,j]| \tag{41}$$

$$Cdiff\_r00b01[i,j] = |Cr00[i,j]| + |Cb01[i,j]| + |Cr00[i,j] - Cb01[i,j]| \tag{42}$$

$$Cdiff\_r01b01[i,j] = |Cr01[i,j]| + |Cb01[i,j]| + |Cr01[i,j] - Cb01[i,j]| \tag{43}$$

$$Cdiff\_r10b00[i,j] = |Cr10[i,j]| + |Cb00[i,j]| + |Cr10[i,j] - Cb00[i,j]| \tag{44}$$

$$Cdiff\_r10b01[i,j] = |Cr10[i,j]| + |Cb01[i,j]| + |Cr10[i,j] - Cb01[i,j]| \tag{45}$$

$$Cdiff\_r01b10[i,j] = |Cr01[i,j]| + |Cb10[i,j]| + |Cr01[i,j] - Cb10[i,j]| \tag{46}$$

$$Cdiff\_r00b10[i,j] = |Cr00[i,j]| + |Cb10[i,j]| + |Cr00[i,j] - Cb10[i,j]| \tag{47}$$

$$Cdiff\_r10b10[i,j] = |Cr10[i,j]| + |Cb10[i,j]| + |Cr10[i,j] - Cb10[i,j]| \tag{48}$$

Note that while in the third embodiment, Cdiff_r00b00 is defined so that no chrominance plane correction processing is performed as indicated by the expression (40), correction processing such as low-pass processing indicated by, for example, the expression (26) may be performed on the Cr and Cb components as indicated by the expression (17) in the first embodiment.

(2-6) Determination of Blur Amount

In the same manner as in (1-6) in the first embodiment, the color indices calculated according to the expressions (40) to (48) are compared with each other and the combination of Cr and Cb that have blur amounts such that the lowest saturation level is obtained are defined as blur amounts to be finally utilized for image creation. That is, according to the conditional expression indicated by the following expression (49), the color index that has the minimum value is extracted out of Cdiff_r00b00 to Cdiff_r10b10 for each pixel, and to create Cr and Cb in that condition, it is decided whether or not it is necessary to blur each of R, G, and B components with the smoothing filter shown in FIG. 11.

(R blur amount for creating Cr, G blur amount for creating Cr, G blur amount for creating Cb, B blur amount for creating Cb)

= arg min (Cdiff_r00b00, Cdiff_r01b00, . . . , Cdiff_r10b10)

(R, R' for Cr)

(G, G' for Cr), (G, G' for Cb)

$$(B, B' \text{ for } Cb) \tag{49}$$

(2-7) Creation of Chrominance Planes for Replacement

Based on the results described in (2-6) above, replacement values of chrominance components, Cr[i,j] and Cb[i,j], for use for final output image are set according to the following expressions (50) and (51), respectively.

$$Cr[i,j] = \text{one of } \{Cr00, Cr01, Cr10\} \tag{50}$$

$$Cb[i,j] = \text{one of } \{Cb00, Cb01, Cb10\} \tag{51}$$

(2-8) Color Conversion

Next, according to the following expressions (52) to (54), the luminance component saved as described in (2-2) above and the chrominance component of which the axial chromatic aberration has been corrected by the processing in (2-7) above are united to create a final output image.

$$R[i,j] = Y[i,j] + (3/4) \times Cr[i,j] - (1/4) \times Cb[i,j] \tag{52}$$

$$G[i,j] = Y[i,j] - (1/4) \times Cr[i,j] - (1/4) \times Cb[i,j] \tag{53}$$

$$B[i,j] = Y[i,j] - (1/4) \times Cr[i,j] + (3/4) \times Cb[i,j] \tag{54}$$

By the processings as described above, when axial chromatic aberration is present in any of R, G, and B color components in a color image and color bleeding occurs thereby, mismatch in MTF characteristics between each color component can be corrected to resolve color bleeding due to the axial chromatic aberration. Then, the color image of which the color bleeding due to the axial chromatic aberration has been resolved is output to the monitor 113 and displayed thereon.

Figure 13:
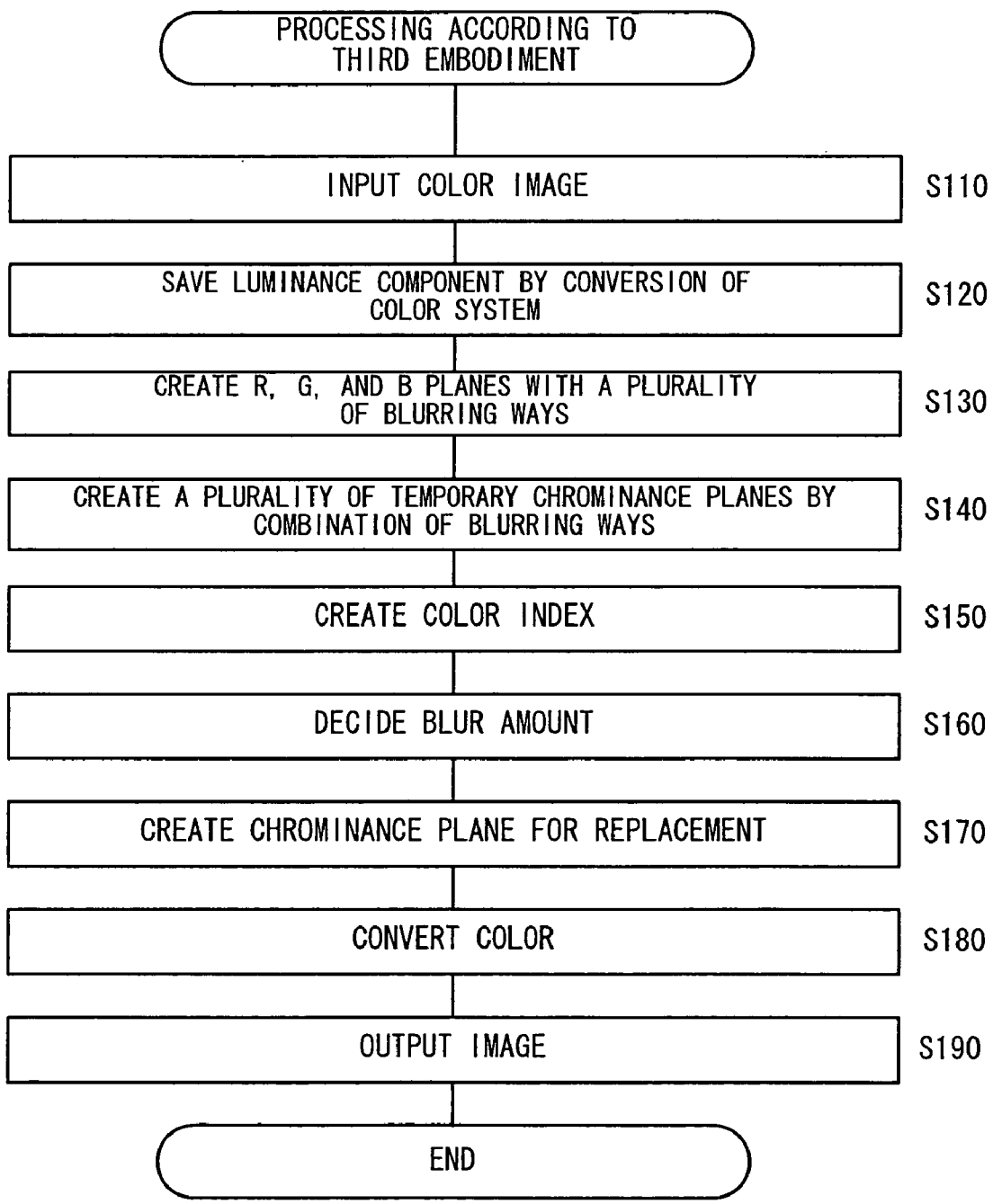
FIG. 13 is a flowchart illustrating an operation of the image processing device 110 in the third embodiment.

FIG. 13 is a flowchart illustrating an operation of the image processing device 110 in the third embodiment. The processings shown in FIG. 13 are executed by the controlling device 111 as a program that is started up when an image captured by the image sensor 102 via the lens 101 is stored in the image memory 112. In a step S110, as mentioned of in (2-1) above, a color image is read-in from the image memory 112 and the flow of control proceeds to a step S120. In the step S120, as mentioned of in (2-2) above, the color system of the read-in color image is converted and the luminance component is saved in a memory space the controlling device 111 has. Subsequently, the flow of control proceeds to a step S130.

In the step 130, a plurality of types of blurred R, G and B plane image preparation processing mentioned of in (2-3) above is performed and the flow of control proceeds to a step S140. In the step S140, a plurality of types of temporary chrominance creation processing by the combination of blurring mentioned of in (2-4) above is performed and the flow of control proceeds to a step S150. In the step S150, color index preparation processing mentioned of in (2-5) is performed and the flow of control proceeds to a step S160. In the step S160, as mentioned of in (2-6) above, a blur amount finally used for image creation is decided and the flow of control proceeds to a step S170.

In the step S170, the chrominance plane creation processing for creating chrominance planes for replacement mentioned of in (2-7) above is performed and the flow of control proceeds to a step S180, where as mentioned of in (2-8) above, the luminance component saved in (2-2) above and the chrominance component of which the axial chromatic aberration has been corrected by the processing in (2-7) above are united to create a final output image. Subsequently, the flow of control proceeds to a step S190, where an image of which color bleeding due to axial chromatic aberration has been resolved is output to the monitor 113 and the control flow of this routine terminates.

In the third embodiment detailed above, unlike the conventional technology, information on color components having low MTFs is corrected utilizing information on color components having high MTFs, so that highly defined correction of axial chromatic aberration can be performed. In addition, blurring is performed not only to the G component but also to the R and B components. This enables performing correction when axial chromatic aberration is present in the G component.

-Fourth Embodiment-

In a fourth embodiment, the digital camera 100 is focused on a subject at a predetermined distance therefrom and a general tendency of axial chromatic aberration to which a subject image is susceptible at a point of focus of the lens 101 is corrected. Note that the block diagram of FIG. 1 showing the digital camera 100 having mounted thereon the image processing device 110, the diagrams of FIGS. 2 and 3 each illustrating a principle according to which color bleeding due to axial chromatic aberration occurs, and the diagram of FIG. 4 illustrating a principle according to which axial chromatic aberration is corrected by matching MTF characteristics are the same as those in the first embodiment and explanation thereon is omitted.

Figure 14:
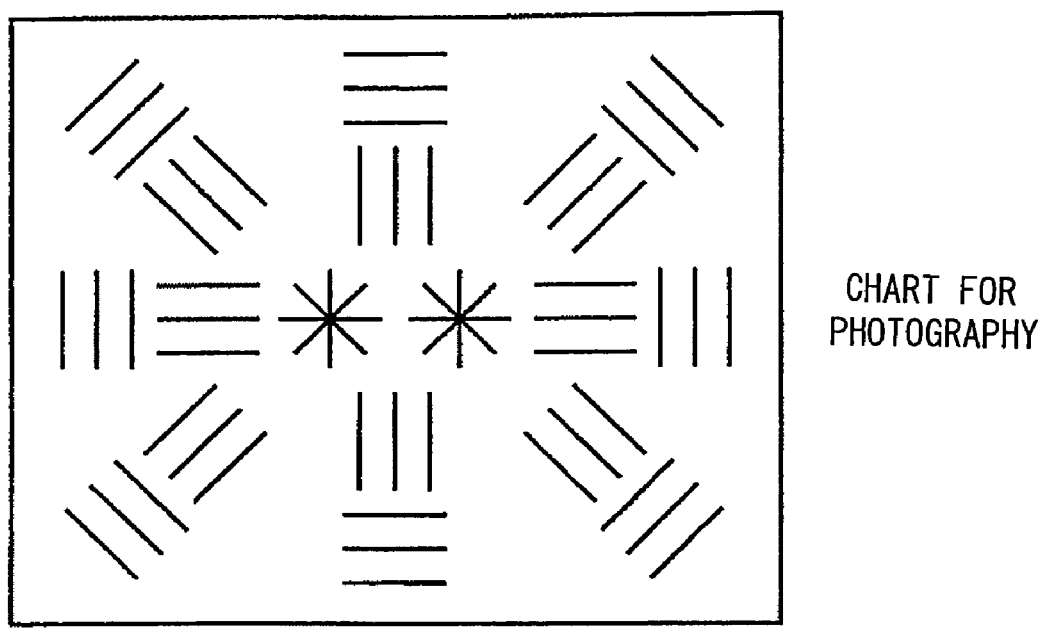
FIG. 14 is a diagram illustrating a specific example of a photographic chart for evaluation in a fourth embodiment.

First, information on axial chromatic aberration that the lens 101 has inherently is examined in advance. That is, a reference subject set at a predetermined distance from the camera is imaged and differences in MTF characteristics between R, G, and B for each of tunable parameters that the lens 101 may assume, for example, type of lens, zoomed position, and aperture value, point of focus are examined in advance as detailed below. Then, while varying each of the tunable parameters, for example, a photographic chart for evaluation as shown in FIG. 14 is imaged and how black line signal level distributes at that time is observed, followed by calculating differences in MTF characteristics between R, G, and B.

Based on the results of calculation, a uniform LPF required for matching the color component that is most sharpened in each of set conditions of tunable parameters to blurred color components is identified, and as shown in FIG. 15, the position of the subject (distance of the camera to the subject) and the type of the identified uniform LPF related to each other for every set condition of the tunable parameters are stored in the memory that the controlling device 111 has.

Then, to correct the axial chromatic aberration in a portion of the target image captured by the image sensor 102 where a principal object (subject) to be photographed is shown up is processed as follows. First, the position of a principal object to be photographed position is detected. On this occasion, taking into consideration that generally a principal object to be photographed is present at a focus position (point of focus) or in the vicinity thereof, the above-mentioned tunable parameters are captured from the image data to identify the focus position in the target image. Note that each tunable parameter is stored as external information on the optical system in, for example, Exif information in the image data of the image captured and the controlling device 113 can identify the focus position referring to the image data.

Assuming that the principal object to be photographed extends around the identified focus position, edge detection is performed in a predetermined area around the focus position as a target area and object extraction is performed by grouping the detected edges. The extracted object is deemed as a principal object to be photographed and axial chromatic aberration correction is performed in the area that includes the object. In concrete terms, a distance between the identified focus position and the principal object to be photographed is decided and the condition of tunable parameters set at the time of capturing the image are decided from the image data. Subsequently, by referring to the table shown in FIG. 15 corresponding to the decided set condition of the tunable parameters, a uniform LPF related to the distance to the principal object to be photographed is selected.

Then, the above-mentioned target area is blurred with the selected uniform LPF to perform axial chromatic aberration correction in the target area as described in the first embodiment and the third embodiment. This makes it possible to judge a uniform LPF based on and matching the set condition of tunable parameters stored as external information concerning the optical system and smooth an appropriate color component to an appropriate smoothing degree using the uniform LPF.

Figure 16:
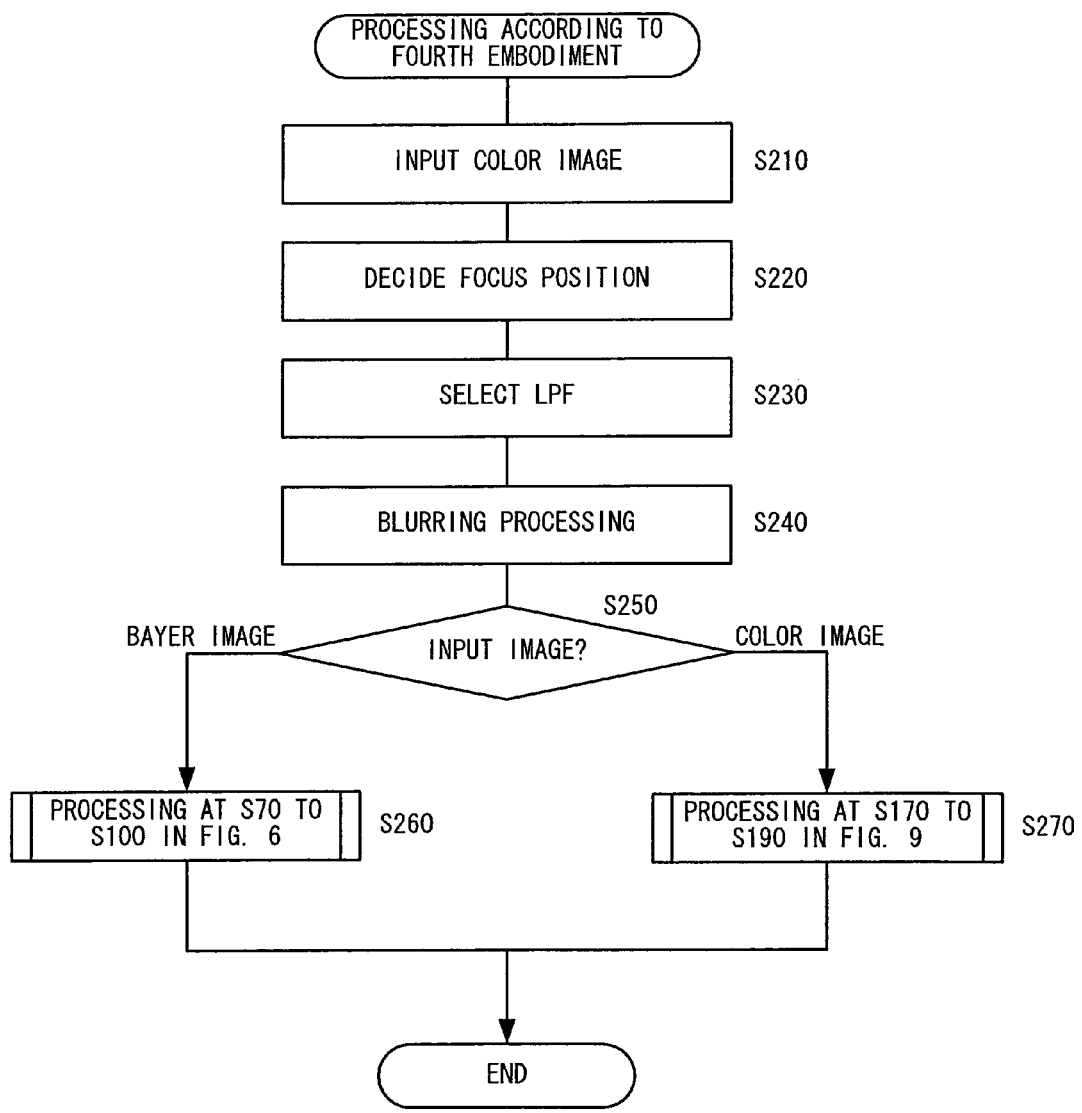
FIG. 16 is a flowchart illustrating an operation of the image processing device 110 in the fourth embodiment.

FIG. 16 is a flowchart illustrating an operation of the image processing device 110 in the fourth embodiment. The processings shown in FIG. 16 are executed by the controlling device 111 as a program that is started up when an image captured by the image sensor 102 via the lens 101 is stored in the image memory 112. In a step S210, the image is read-in from the image memory 112 and the flow of control proceeds to a step S220. In the step S220, a focus position is identified from the image data as described above and the flow of control proceeds to a step S230.

In the step S230, the set condition of tunable parameters at the time of capturing the image is judged from the image data and a uniform LPF related to the focus position, that is, the distance of the camera to the principal object to be photographed is selected by referring to the list shown in FIG. 15 corresponding to the set condition of the tunable parameters. Subsequently, the flow of control proceeds to a step S240, where the read-in image is blurred using the selected uniform LPF, and the flow of control proceeds to a step S250. In the step S250, it is judged whether the input image, that is, the image read-in from the image memory 112 is an image output by a single-plate color image sensor, such as Bayer array or an interpolated color image.

Then, if it is judged that the input image is an image output by a single-plate color image sensor, the flow of control proceeds to a step S260, where the processings in the steps S70 to S100 shown in FIG. 8 in the first embodiment are performed to correct the axial chromatic aberration of the image and the corrected image is output to the monitor 113 and displayed thereon. Then, the control flow of this routine terminates. On the contrary, if it is judged that the input image is an interpolated color image, the flow of control proceeds to a step S270, where the processings in the steps S170 to S190 shown in FIG. 13 in the above-mentioned third embodiment are performed to correct the axial chromatic aberration and the corrected image is output to the monitor 113 and displayed thereon. Then, the control flow of this routine terminates.

According to the above-mentioned fourth embodiment, in addition to the effects of the first to third embodiments, the following effects can be obtained.

(1) A principal object to be photographed is extracted based on the information on focus position contained in the image data, the distance of the camera to the extracted principal object to be photographed is decided, a uniform LPF related to the distance of the camera to the principal object to be photographed is selected by referring to the table shown in FIG. 15, and the image in an area where the principal object to be photographed is present is blurred using the selected uniform LPF. As a result, it is only needed for blurring the image to select the already set uniform LPF based on the distance of the camera to the principle object to be photographed, so that various processings for deciding a blur amount become unnecessary and the processings can be performed in an increased speed.

(2) When determining the distance of the camera to the principal object to be photographed, edge detection is performed in a predetermined area around the focus position as a target area and object extraction is performed by grouping the detected edges. The extracted object is deemed as a principal object to be photographed. This enables exact extraction of the principal object to be photographed taking into consideration that generally, it is frequently the case that the principal object to be photographed is present at the focus position or in the vicinity thereof and axial chromatic aberration correction is performed in the area that includes the principal object.

-Variation Example-

Note that the image processing devices in the above-mentioned embodiments may be modified as follows.

(1) In the first and second embodiments, explanation has been made on the example, in which the image sensor 102 is of a type such that most typical R (red), G (green), and B (blue) color filters of, for example, a single-plate image sensor are arranged in a Bayer array, the image data of the image captured by the image sensor 102 is expressed in an RGB color system, and color information on any one of color components R, G, and B is present in each pixel that constitutes the image data. However, the present invention is not limited to this example and may be configured to be of a type in which a 2-plate color image sensor is used as the image sensor 102 and color information on any two of the color components R, G, and B is present in each pixel that constitutes the image data. That is, the image sensor 102 may be any image sensor so far as it captures an image in which at least one color component is missing for each pixel having a plurality of color components whose MTF characteristics are different on the image-capturing plane.

(2) In the above-mentioned first to third embodiments, explanation has been made on the example in which upon deciding the blur amounts in (1-6) and (2-6), discrete blur amounts finally utilized for image creation are judged. However, the present invention is not limited to this and continuous blur amounts may be judged. For example, Cr1 and Cr2 as a whole is expressed Cr_blur and linear coupling is performed as indicated by the following expressions (55) and (56). Note that while an example is explained herein in which Cr_blur and Cb_blur are created in a linear coupling state (weighted coefficient (s,t)) of the G color component with blurring G" and G color component without blurring, a linear coupling in which G' is added in a similar manner may also be used.

$$Cr\_blur = R - \{s^* <G''> + (1-s)^* <G>\} \tag{55}$$

$$Cb\_blur = B - \{t^* <G''> + (1-t)^* <G>\} \tag{56}$$

wherein $0 = <(s,t) = <1$.

Based on Cr_blur and Cb_blur created according to the expressions (55) and (56), respectively, a color index Cdiff_blur corresponding to the blurred one is created according to the following expression (57).

$$Cdiff\_blur = |Cr\_blur[i,j]| + |Cb\_blur[i,j]| + |Cr\_blur[i,j] - Cb\_blur[i,j]| \tag{57}$$

Figure 17:
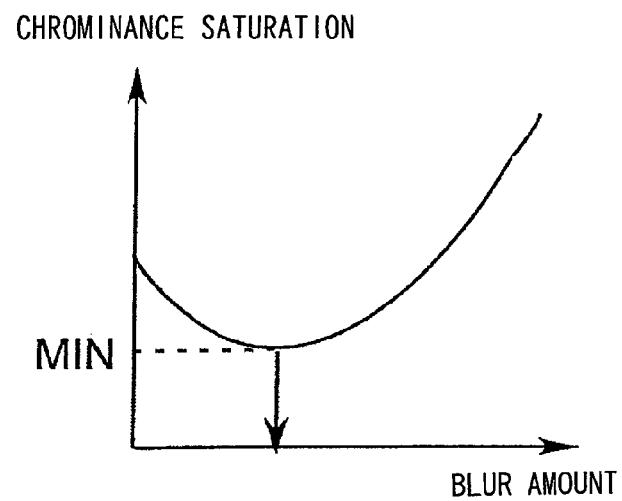
FIG. 17 is a diagram illustrating a specific example of a continuous blur amount judging method.

Then, the combination of (s,t) that gives the minimum value of Cdiff_blur is two-dimensionally searched as shown in FIG. 17. Subsequently, the minimum value of Cdiff_blur and the color index Cdiff_r0b0 without blur are compared with each other and it is decided whether the blur amount (s,t) is adopted or no blurring is performed. This comparison is to be done only when Cdiff_r0b0 is singled out for special treatment.

Note that when the image is blurred using the continuous blur amount judged in this manner, the chrominance components Cr[i,j] and Cb[i,j] used in the final output image in the above-mentioned actual chrominance plane creation processing described in (1-7) in the first embodiment may be acquired according to the following expressions (58) and (59), respectively, instead of the expressions (28) and (29), respectively.

$$Cr[i,j] = \text{one of } \{Cr0, Cr\_blur(s; 0 = <s = <1)\} \; R \text{ positiont} \tag{58}$$

$$Cb[i,j] = \text{one of } \{Cb0, Cb\_blur(s; 0 = <s = <1)\} \; B \text{ position} \tag{59}$$

(3) In the above-mentioned first embodiment, explanation has been made on the example in which after comparing the combinations of a plurality of types of chrominance planes with each other immediately after they are created from the Bayer plane and the blur amount is decided before usual interpolation processing can be performed. However, the present invention is not limited to this and the blur amounts may be decided after interpolation processing of chrominance planes corresponding to a plurality of types of blurs is performed with usual interpolation processing and adaptive chrominance plane correction processing.

(4) In the first to third embodiments, the blurring way has been decided by observing the color response of each color component created in response to a plurality of blurring ways by pixel. However, the present invention is not limited to this. Since judging from the factors of occurrence of axial chromatic aberration, it can be assumed that there is a less abrupt change on the level of pixel, the processing may be performed by block bridging a plurality of pixels, a uniform method of blurring to be applied to a broader area can be selected.

For example, the Bayer image read-in from the image memory 112 is divided into a plurality of blocks having a size of 64 pixels×64 pixels and a color index of each pixel is calculated as described in the first embodiment to calculate an average value of color index in each block. Then, the color indices are compared by block based on the average value of the color index in each block and the set of blurring ways that gives the minimum value is commonly applied to the block. Thus, axial chromatic aberration correction may be performed by block.

Note that in this case, the axial chromatic aberration is performed in each block and hence there is a possibility that an unnatural chrominance may occur on the boundary between each block. To avoid this, a further modification may be made as follows. That is, after calculating color indices, average values of the color indices among a plurality of pixels (for example, 16×16 or 64×64) are calculated and the results are evaluated by pixel in the same manner as in (1-6) or (2-6). This results in determination of a uniform blur amount in the averaged range, so that unnaturalness on the boundary between the blocks can be eliminated.

(5) In the above-mentioned third embodiment, explanation has been made on the example in which the color image expressed in the RGB color system is converted into image data of a YCbCr format before axial chromatic aberration correction can be performed. However, the present invention is not limited to this and the axial chromatic aberration correction may be performed on the data of the RGB format as it is. That is, the MTF matching processing (expressions (1) and (2)) in FIG. 4 may be directly performed on each of R, G, and B.

(6) In the above-mentioned fourth embodiment, explanation has been made on the example in which the principal object to be photographed is extracted based on the information on focus position contained in the image data and the correction is made only in the area in which the principal object to be photographed is present. However, the present invention is not limited to this and the axial chromatic aberration correction may be performed on the whole image.

(7) In the above-mentioned fourth embodiment, explanation has been made on the example in which the distance of the camera to the object to be photographed is identified based on the focus position information contained in the image data. However, the present invention is not limited to this and the distance of the camera to the object to be photographed may be identified based on the photographing mode of the camera, such as "closeup photography", "portrait photography", or "landscape photography". For example, in the case of closeup photography, it is judged that the object to be photographed is present very near and the correspondence table shown in FIG. 15 may be referred to.

(8) In the above-mentioned first to fourth embodiments, explanation has been made on the example in which various image processings are preformed by the controlling device mounted on the digital camera 100 and axial chromatic aberration correction is performed on the image captured by the image sensor 102 via the lens 101. However, the present invention is not limited to this and for example, a program that executes the image processings having the above-mentioned content may be installed in an electronic appliance such as a personal computer in advance and the image captured by the digital camera may be introduced into the electronic appliance through various types of interface before the axial chromatic aberration correction is performed. Note that such a program is provided to the electronic appliance such as a personal computer via a recording medium such as a CD or an electric communication line such as the Internet.

Figure 19:
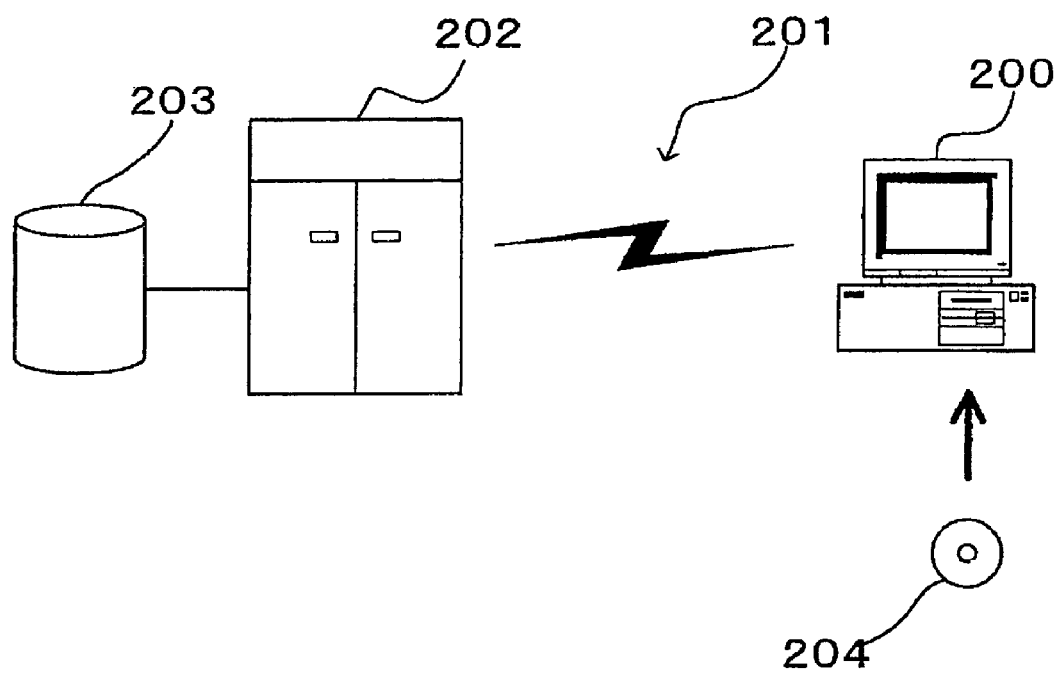
FIG. 19 is a diagram illustrating the manner of providing a program to a personal computer through a recording medium such as a CD or an electric communication line such as the Internet.

FIG. 19 is a diagram illustrating the above-mentioned manner. A personal computer 200 receives a program via a CD-ROM 204, which is a recording medium. The personal computer 200 has a connecting function with a communication line 201. A computer 202 is a server computer that provides the program and stores the program in a recording medium such as a hard disk 203. The communication line 201 is a communication line such as the Internet or a dedicated communication line. The computer 202 uses the hard disk 203 to read out the program and transmits the program to the personal computer 200 via the communication line 201. That is, the program is embodied on a carrier wave as data signals and transmitted via the communication line 201. In this manner, the program can be provided as a computer-readable program product in various forms such as those as stored in a recording medium or embodied on a carrier wave.

Figure 18:
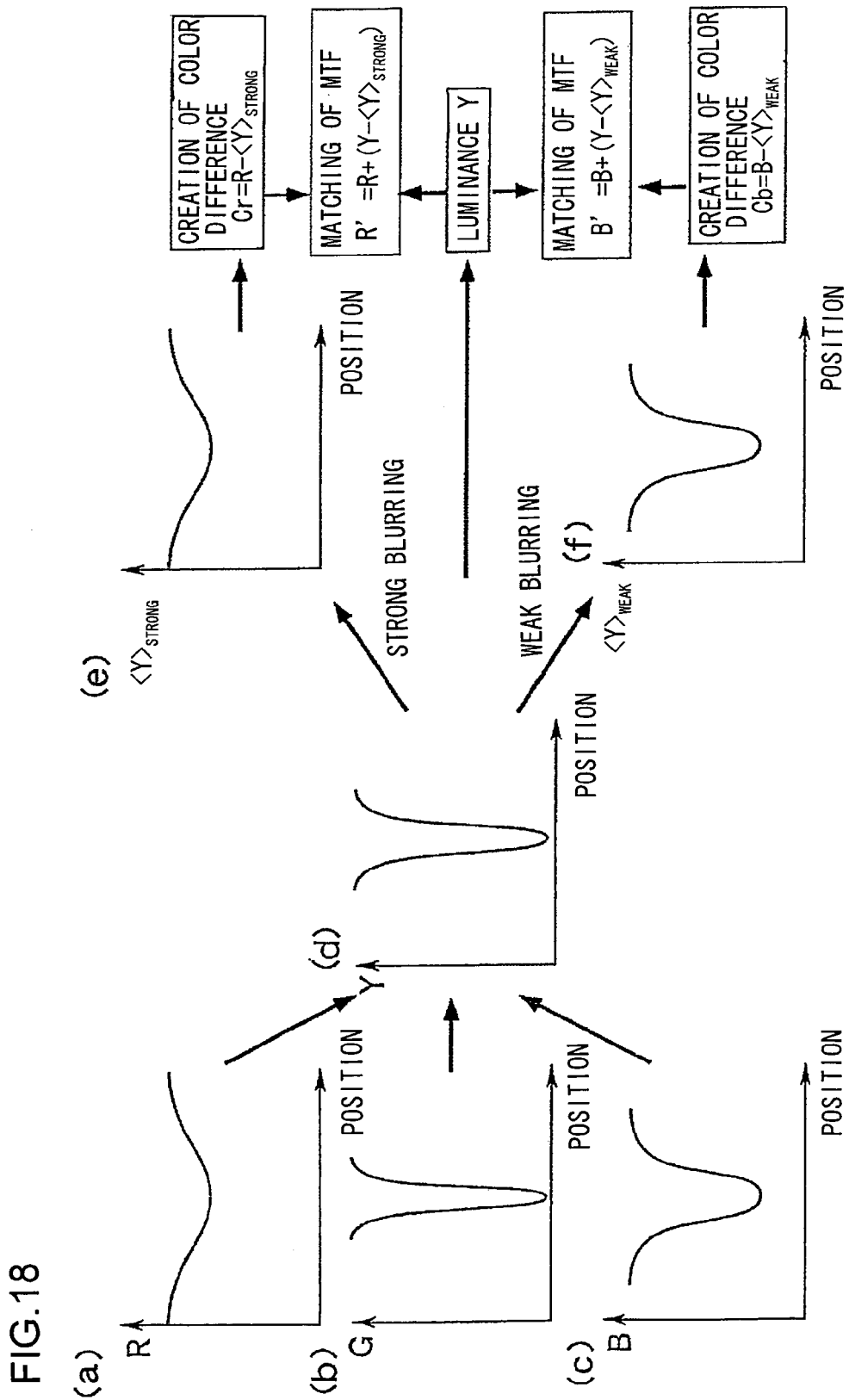
FIG. 18 is a diagram illustrating a principle according to which axial chromatic aberration is corrected by matching MTF characteristics in Variation Example (9)

(9) In the above-mentioned first to fourth embodiments, explanation has been made on the example in which MTFs are matched based on the principle as shown in FIG. 4 and the axial chromatic aberration is corrected. However, the present invention is not limited to this and MTFs may be matched by creating a luminance plane Y (FIG. 18(d)) from each color components, R, G, and B and smoothing the luminance Y as shown in FIG. 18.

Note that the present invention is not limited to the constructions in the above-mentioned embodiments so far as the functions characteristic to the present invention are not damaged.

The disclosure of the following priority applications are herein incorporated by reference:

Japanese Patent Application No. 2005-205354 (filed Jul. 14, 2005);

Japanese Patent Application No. 2005-205355 (filed Jul. 14, 2005); and

Japanese Patent Application No. 2005-205356 (filed Jul. 14, 2005).

The invention claimed is:

1. An image processing device that converts a first image captured via an optical system in which one pixel has at least one of a plurality of color components and MTF characteristics are different between at least two color components at an imaging plane, into a second image in which MTF characteristics are matched, comprising:
   an MTF correction unit that performs smoothing or sharpening processing to one of the at least two color components of the first image to correct MTF thereof;
   a comparison unit that performs a plurality of ways of processing for correcting the MTF and compares color responses therebetween;
   a decision unit that decides one MTF correction processing out of the plurality of ways of processing for correcting the MTF based on a result of comparing the color responses by the comparison unit; and
   an image conversion unit that matches MTF characteristics of one color component out of the at least two color components to MTF characteristics of the other color component based on a result of performing the one MTF correction processing decided by the decision unit.

2. An image processing device according to claim 1, wherein:
   the decision unit creates a plurality of types of chrominance components that represent different color information for one pixel and decides the smoothing degree taking into consideration new chrominance information formed by combinations of the plurality of types of the chrominance components.

3. An image processing device according to claim 2, wherein:
   the decision unit decides the smoothing degree in the smoothing processing for each color component of the first image that constitutes each type of chrominance component when a plurality of types of chrominance that represent different color information are created for one pixel.

4. An image processing device according to claim 1, wherein:
the decision unit decides a smoothing degree for each pixel.

5. An image processing device according to claim 1, wherein:
the decision unit decides a common smoothing degree to be applied over a plurality of pixels.

6. An image processing device that converts a first image captured via an optical system in which one pixel has at least one of a plurality of color components and MTF characteristics are different between at least two color components at an imaging plane, into a second image in which MTF characteristics are matched, comprising:
a smoothing unit that performs smoothing processing to one color component out of the at least two color components of the first image at a plurality of smoothing degrees including a case in which no smoothing processing is performed;
a comparison unit that compares color responses in response to changes in MTF characteristics between a plurality of cases in which the smoothing processing is performed at the plurality of smoothing degrees;
a decision unit that decides one smoothing degree out of the plurality of smoothing degrees based on a result of comparing the color responses by the comparison unit; and
an image conversion unit that matches MTF characteristics of one color component out of the at least two color components to MTF characteristics of the other color component based on a result of performing the smoothing processing at the one smoothing degree decided by the decision unit.

7. An image processing device according to claim 6, wherein:
the comparison unit creates a plurality of types of chrominance components in each pixel of each image on which the smoothing processing has been performed at the plurality of smoothing degrees and compares the color responses based on the created chrominance components.

8. An image processing device according to claim 7, wherein:
the comparison unit calculates a plurality of indices concerning saturation based on the plurality of types of chrominance in each pixel of each image on which the smoothing processing has been performed at the plurality of smoothing degrees and compares the indices concerning saturation to thereby compare the color responses.

9. An image processing device according to claim 8, wherein:
the decision unit decides a smoothing degree that gives a lowest saturation level based on the plurality of indices concerning saturation as the smoothing degree on the color components of the first image for conversion into the second image.

10. An image processing device according to claim 7, wherein:
the comparison unit uses the created chrominance components having undergone correction processing with chrominance components of peripheral pixels, as the chrominance components when the smoothing processing is not performed.

11. An image processing method for creating an image having matched MTF characteristics, comprising:
capturing a first image having a plurality of color components in which the MTF characteristics are different between at least two color components at an imaging plane;
performing a plurality of ways of smoothing processing on one color component out of the at least two color components of the first image;
creating a plurality of chrominance components using the one color component on which the smoothing processing has not been performed and the one color component on which the plurality of series of the smoothing processing has been performed;
selecting, from the plurality of chrominance components, a chrominance component that represents a state in which the MTF characteristics are most matched between the one color component and the other color component; and
creating a second image in which the MTF characteristics of the plurality of color components are matched using the selected chrominance component and the captured first image.

12. An image processing method according to claim 11, further comprising:
acquiring saturation using the plurality of created chrominance components; and
selecting a chrominance component used when the acquired saturation is lowest, as a chrominance component that represents a state in which the MTF characteristics are most matched between the one color component and the other color component.

13. An image processing method according to claim 11, further comprising:
acquiring a luminance component from the captured first image; and
creating a second image in which the MTF characteristics of the plurality of color components are matched using the selected chrominance component and the acquired luminance component.

* * * * *